United States Patent
Ueno et al.

(10) Patent No.: US 12,516,231 B2
(45) Date of Patent: Jan. 6, 2026

(54) WORKING FLUID FOR HEAT CYCLE, COMPOSITION FOR HEAT CYCLE SYSTEM AND HEAT CYCLE SYSTEM

(71) Applicant: AGC Inc., Tokyo (JP)

(72) Inventors: Katsuya Ueno, Chiyoda-ku (JP);
Hikaru Ono, Chiyoda-ku (JP);
Toshiyuki Tanaka, Chiyoda-ku (JP);
Hidekazu Okamoto, Chiyoda-ku (JP);
Hiroki Hayamizu, Chiyoda-ku (JP);
Masato Fukushima, Chiyoda-ku (JP);
Mai Tasaka, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 940 days.

(21) Appl. No.: 17/682,416

(22) Filed: Feb. 28, 2022

(65) Prior Publication Data
US 2022/0177761 A1 Jun. 9, 2022

Related U.S. Application Data

(60) Division of application No. 15/825,975, filed on Nov. 29, 2017, now abandoned, which is a continuation of application No. PCT/JP2016/065818, filed on May 27, 2016.

(30) Foreign Application Priority Data

Jun. 1, 2015 (JP) .................. 2015-111614

(51) Int. Cl.
*C09K 5/04* (2006.01)
(52) U.S. Cl.
CPC ............. *C09K 5/044* (2013.01); *C09K 5/04* (2013.01); *C09K 5/045* (2013.01); *C09K 2205/106* (2013.01); *C09K 2205/12* (2013.01); *C09K 2205/126* (2013.01); *C09K 2205/13* (2013.01); *C09K 2205/132* (2013.01); *C09K 2205/40* (2013.01)

(58) Field of Classification Search
CPC ........................................ C09K 5/045
See application file for complete search history.

(56) References Cited

U.S. PATENT DOCUMENTS

| 2008/0157022 A1 | 7/2008 | Singh et al. |
| 2009/0143604 A1 | 6/2009 | Nappa et al. |
| 2012/0187330 A1 | 7/2012 | Sinch |

(Continued)

FOREIGN PATENT DOCUMENTS

| CN | 101861322 A | 10/2010 |
| CN | 103562338 A | 2/2014 |

(Continued)

OTHER PUBLICATIONS

International Search Report issued Aug. 30, 2016 in PCT/JP2016/065818, filed on May 27, 2016 (with English Translation).

(Continued)

*Primary Examiner* — Peter F Godenschwager
(74) *Attorney, Agent, or Firm* — Oblon, McClelland, Maier & Neustadt, L.L.P.

(57) ABSTRACT

A working fluid for a heat cycle, contains: trifluoroethylene; and a first component consisting of at least one of substance selected from carbon dioxide, fluoromethane, trifluoroiodomethane, methane, ethane, propane, helium, neon, argon, krypton, xenon, nitrogen and ammonia.

17 Claims, 2 Drawing Sheets

(56) References Cited

U.S. PATENT DOCUMENTS

| | | |
|---|---|---|
| 2014/0070132 A1 | 3/2014 | Fukushima |
| 2015/0337191 A1 | 11/2015 | Fukushima |
| 2015/0376486 A1 | 12/2015 | Hashimoto et al. |
| 2016/0075927 A1 | 3/2016 | Fukushima |
| 2016/0333245 A1 | 11/2016 | Fujii et al. |
| 2018/0057724 A1 | 3/2018 | Fukushima et al. |

FOREIGN PATENT DOCUMENTS

| | | |
|---|---|---|
| CN | 104968757 A | 10/2015 |
| CN | 105164228 A | 12/2015 |
| CN | 105452417 A | 3/2016 |
| EP | 2 711 405 A1 | 3/2014 |
| EP | 2 955 214 A1 | 12/2015 |
| EP | 2 993 213 A1 | 3/2016 |
| EP | 3 020 780 A1 | 5/2016 |
| JP | 2012-505296 | 3/2012 |
| JP | 2014-98166 | 5/2014 |
| JP | 2015-7257 | 1/2015 |
| JP | 2015-10058 A | 1/2015 |
| JP | WO 2015/125876 A1 | 8/2015 |
| JP | 2015-215112 A | 12/2015 |
| JP | 2015-215123 A | 12/2015 |
| JP | 2016-56374 | 4/2016 |
| KR | 10-2010-0099182 | 9/2010 |
| RU | 2011 118 429 A | 11/2012 |
| RU | 2013 156 380 A | 6/2015 |
| TW | 201014816 | 4/2010 |
| WO | WO 2010/042781 A2 | 4/2010 |
| WO | WO 2012/157764 A1 | 11/2012 |
| WO | WO 2014/123120 A1 | 8/2014 |
| WO | WO 2014/178352 A1 | 11/2014 |
| WO | WO 2014/178353 A1 | 11/2014 |
| WO | WO 2015/005290 A1 | 1/2015 |
| WO | WO 2015/125885 A1 | 8/2015 |

OTHER PUBLICATIONS

Written Opinion issued Aug. 30, 2016 in PCT/JP2016/065818, filed on May 27, 2016.

Partial European Search Report issued on Dec. 21, 2018 in Patent Application No. 16803282.9, 13 pages.

WORKING FLUID FOR HEAT CYCLE, COMPOSITION FOR HEAT CYCLE SYSTEM AND HEAT CYCLE SYSTEM

CROSS-REFERENCE TO RELATED APPLICATIONS

This application is a divisional of U.S. application Ser. No. 15/825,975 filed Nov. 29, 2017, pending, which is a continuation of prior International Application No. PCT/JP2016/065818 filed on May 27, 2016, which is based upon and claims the benefit of priority from Japanese Patent Application No. 2015-111614 filed on Jun. 1, 2015; the entire contents of all of which are incorporated herein by reference.

TECHNICAL FIELD

The present invention relates to a working fluid for a heat cycle, a composition for a heat cycle system and a heat cycle system using the composition.

BACKGROUND

In this specification, abbreviated names of halogenated hydrocarbon compounds are described in parentheses after the compound names, and the abbreviated names are employed in place of the compound names as necessary.

Conventionally, as a working fluid for a heat cycle system such as a refrigerant for a refrigerator, a refrigerant for an air-conditioning apparatus, a working fluid for a power generation system (such as an exhaust heat recovery power generation), a working fluid for a latent heat transport apparatus (such as a heat pipe), or a secondary cooling medium, there have been used chlorofluorocarbon (CFC) such as chlorotrifluoromethane or dichlorodifluoromethane, and hydrochlorofluorocarbon (HCFC) such as chlorodifluoromethane. However, effects of CFC and HCFC on the ozone layer in the stratosphere have been pointed out, and they are subjected to regulation at present.

Under such circumstances, as a working fluid for a heat cycle system, hydrofluorocarbons (HFC) having less effect on the ozone layer, such as difluoromethane (HFC-32), tetrafluoroethane, and pentafluoroethane (HFC-125), have been used in place of CFC and HCFC. For example, R410A (a pseudoazeotropic mixture refrigerant of HFC-32 and HFC-125 at a mass ratio of 1:1) or the like is a refrigerant that has been widely used conventionally. However, it has been pointed out that HFCs may cause global warming.

R410A has been widely used for normal air-conditioning apparatuses or the like what is called a packaged air-conditioner and a room air-conditioner due to its high refrigerating capacity. However, R410A has a global warming potential (GWP) as high as 2088. It is therefore required to develop a low GWP working fluid. In this case, it is required to develop a working fluid on the premise that an apparatus which has been used is continuously used as it is just by replacing R410A.

In recent years, expectations are concentrated on hydrofluoroolefin (HFO), that is, HFC having a carbon-carbon double bond, which is a working fluid having less effect on the ozone layer and less effect on global warming because the carbon-carbon double bond is likely to be decomposed by OH radicals in the air. In this specification, saturated HFC is called HFC and discriminated from HFO unless otherwise stated. Further, HFC may be clearly described as saturated hydrofluorocarbon in some cases.

As a working fluid using HFO, for example, there is disclosed a technology relating to a working fluid using trifluoroethylene (HFO-1123) having the above-stated properties and capable of obtaining excellent cycle performance in Patent Document 1 (WO 2012/157764 A1). In Patent Document 1, there has further been attempted to enable a working fluid where various HFCs and HFOs are used in combination with HFO-1123 in order to increase incombustibility, cycle performance, and so on of the working fluid.

Note that HFO-1123 is known to undergo what is called a self-decomposition reaction when there is an ignition source at higher temperature or under high pressure. Accordingly, there is a problem that it is necessary to improve durability of a working fluid for a heat cycle using HFO-1123 by suppressing a self-decomposition property when a composition containing HFO-1123 is practically used as the working fluid for the heat cycle.

SUMMARY

However, there is no information or suggestion in Patent Document 1 about combining HFO-1123 and other compounds to make a working fluid from viewpoints of exerting less effect on global warming, providing cycle performance such as capacity and efficiency capable of replacing R410A, suppressing a self-decomposition property, and so on, as a replacement candidate of R410A.

The present invention has been made from the above-described viewpoints, and an object thereof is to provide: a working fluid for a heat cycle and a composition for a heat cycle system containing trifluoroethylene (HFO-1123), sufficiently exerting excellent cycle performance held by HFO-1123, suppressing a self-decomposition property and having a low global warming potential; and a heat cycle system using the composition, exerting less effect on global warming, and including both high cycle performance and durability.

The present invention provides a working fluid for a heat cycle, a composition for a heat cycle system and a heat cycle system having the following configurations described in [1] to [28].

[1] A working fluid for a heat cycle, comprising: trifluoroethylene; and a first component consisting of at least one of substance selected from carbon dioxide, fluoromethane, trifluoroiodomethane, methane, ethane, propane, helium, neon, argon, krypton, xenon, nitrogen and ammonia.

[2] The working fluid for the heat cycle according to [1], wherein the first component is consisting of at least one of substance selected from carbon dioxide, fluoromethane, trifluoroiodomethane and propane.

[3] The working fluid for the heat cycle according to [1], wherein carbon dioxide is contained as the first component.

[4] The working fluid for the heat cycle according to [1], wherein fluoromethane is contained as the first component.

[5] The working fluid for the heat cycle according to [1], wherein trifluoroiodomethane is contained as the first component.

[6] The working fluid for the heat cycle according to [1], wherein propane is contained as the first component.

[7] The working fluid for the heat cycle according to [1], wherein a ratio of a total amount of the trifluoroethylene and the first component with respect to an entire amount of the working fluid for the heat cycle is over 90 mass % and 100 mass % or less, and wherein a ratio of an amount of the trifluoroethylene with respect to the total amount of the trifluoroethylene and the first component is 20 mass % or more and 95 mass % or less.

[8] The working fluid for the heat cycle according to [3], wherein a ratio of a total amount of the trifluoroethylene and the carbon dioxide with respect to an entire amount of the working fluid for the heat cycle is over 90 mass % and 100 mass % or less, and wherein a ratio of an amount of the trifluoroethylene with respect to the total amount of the trifluoroethylene and the carbon dioxide is 70 mass % or more and 80 mass % or less.

[9] The working fluid for the heat cycle according to [4], wherein a ratio of a total amount of the trifluoroethylene and the fluoromethane with respect to an entire amount of the working fluid for the heat cycle is over 90 mass % and 100 mass % or less, and wherein a ratio of an amount of the trifluoroethylene with respect to the total amount of the trifluoroethylene and the fluoromethane is 20 mass % or more and 80 mass % or less.

[10] The working fluid for the heat cycle according to [5], wherein a ratio of a total amount of the trifluoroethylene and the trifluoroiodomethane with respect to an entire amount of the working fluid for the heat cycle is over 90 mass % and 100 mass % or less, and wherein a ratio of an amount of the trifluoroethylene with respect to the total amount of the trifluoroethylene and the trifluoroiodomethane is 60 mass % or more and 80 mass % or less.

[11] The working fluid for the heat cycle according to [6], wherein a ratio of a total amount of the trifluoroethylene and the propane with respect to an entire amount of the working fluid for the heat cycle is over 90 mass % and 100 mass % or less, and wherein a ratio of an amount of the trifluoroethylene with respect to the total amount of the trifluoroethylene and the propane is 20 mass % or more and 95 mass % or less.

[12] The working fluid for the heat cycle according to [1], further comprising: a second component consisting of at least one of substance selected from hydrofluorocarbon except fluoromethane and hydrofluoroolefin except trifluoroethylene, and wherein the hydrofluorocarbon and the hydrofluoroolefin have a global warming potential (100 years) in the Intergovernmental Panel on Climate Change (IPCC) Fourth Assessment Report of 2000 or less.

[13] The working fluid for the heat cycle according to [12], wherein the second component is consisting of at least one of substance selected from 2,3,3,3-tetrafluoropropene, 1,3,3,3-tetrafluoropropene and difluoromethane.

[14] The working fluid for the heat cycle according to [12], wherein difluoromethane is contained as the second component.

[15] The working fluid for the heat cycle according to [12], wherein 2,3,3,3-tetrafluoropropene is contained as the second component.

[16] The working fluid for the heat cycle according to [12], wherein 1,3,3,3-tetrafluoropropene is contained as the second component.

[17] The working fluid for the heat cycle according to [12], wherein a ratio of a total amount of the trifluoroethylene, the first component and the second component with respect to an entire amount of the working fluid for the heat cycle is over 90 mass % and 100 mass % or less, wherein a ratio of an amount of the trifluoroethylene with respect to the total amount of the trifluoroethylene, the first component and the second component is 10 mass % or more and 90 mass % or less, wherein a ratio of an amount of the first component with respect to the total amount of the trifluoroethylene, the first component and the second component is 1 mass % or more and 50 mass % or less, and wherein a ratio of an amount of the second component with respect to the total amount of the trifluoroethylene, the first component and the second component is 1 mass % or more and 70 mass % or less.

[18] The working fluid for the heat cycle according to [12], wherein a ratio of a total amount of the trifluoroethylene, the carbon dioxide and the second component with respect to an entire amount of the working fluid for the heat cycle is over 90 mass % and 100 mass % or less, wherein a ratio of an amount of the trifluoroethylene with respect to the total amount of the trifluoroethylene, the carbon dioxide and the second component is 10 mass % or more and 90 mass % or less, wherein a ratio of an amount of the carbon dioxide with respect to the total amount of the trifluoroethylene, the carbon dioxide and the second component is 1 mass % or more and 50 mass % or less, and wherein a ratio of an amount of the second component with respect to the total amount of the trifluoroethylene, the carbon dioxide and the second component is 1 mass % or more and 70 mass % or less.

[19] The working fluid for the heat cycle according to [14], wherein a ratio of a total amount of the trifluoroethylene, the carbon dioxide and the difluoromethane with respect to an entire amount of the working fluid for the heat cycle is over 90 mass % and 100 mass % or less, wherein a ratio of an amount of the trifluoroethylene with respect to the total amount of the trifluoroethylene, the carbon dioxide and the difluoromethane is 10 mass % or more and 90 mass % or less, wherein a ratio of an amount of the carbon dioxide with respect to the total amount of the trifluoroethylene, the carbon dioxide and the difluoromethane is 1 mass % or more and 50 mass % or less, and wherein a ratio of an amount of the difluoromethane with respect to the total amount of the trifluoroethylene, the carbon dioxide and the difluoromethane is 1 mass % or more and 29 mass % or less.

[20] The working fluid for the heat cycle according to [15], wherein a ratio of a total amount of the trifluoroethylene, the carbon dioxide and the 2,3,3,3-tetrafluoropropene with respect to an entire amount of the working fluid for the heat cycle is over 90 mass % and 100 mass % or less, wherein a ratio of an amount of the trifluoroethylene with respect to the total amount of the trifluoroethylene, the carbon dioxide and the 2,3,3,3-tetrafluoropropene is 10 mass % or more and 90 mass % or less, wherein a ratio of an amount of the carbon dioxide with respect to the total amount of the trifluoroethylene, the carbon dioxide and the 2,3,3,3-tetrafluoropropene is 1 mass % or more and 50 mass % or less, and wherein a ratio of an amount of the 2,3,3,3-tetrafluoropropene with respect to the total amount of the trifluoroethylene, the carbon dioxide and the 2,3,3,3-tetrafluoropropene is 1 mass % or more and 70 mass % or less.

[21] The working fluid for the heat cycle according to [16], wherein a ratio of a total amount of the trifluoroethylene, the carbon dioxide and the 1,3,3,3-tetrafluoropropene with respect to an entire amount of the working fluid for the heat cycle is over 90 mass % and 100 mass % or less, wherein a ratio of an amount of the trifluoroethylene with respect to the total amount of the trifluoroethylene, the carbon dioxide and the 1,3,3,3-tetrafluoropropene is 10 mass % or more and 90 mass % or less, wherein a ratio of an amount of the carbon dioxide with respect to the total amount of the trifluoroethylene, the carbon dioxide and the 1,3,3,3-tetrafluoropropene is 1 mass % or more and 50 mass % or less, and wherein a ratio of an amount of the 1,3,3,3-tetrafluoropropene with respect to the total amount of the trifluoroethylene, the carbon dioxide and the 1,3,3,3-tetrafluoropropene is 1 mass % or more and 70 mass % or less.

[22] The working fluid for the heat cycle according to [12], wherein a ratio of a total amount of the trifluoroethylene, the propane and the second component with respect to an entire amount of the working fluid for the heat cycle is over 90 mass % and 100 mass % or less, wherein a ratio of an amount of the trifluoroethylene with respect to the total amount of the trifluoroethylene, the propane and the second component is 20 mass % or more and 95 mass % or less, wherein a ratio of an amount of the propane with respect to the total amount of the trifluoroethylene, the propane and the second component is 1 mass % or more and 75 mass % or less, and wherein a ratio of an amount of the second component with respect to the total amount of the trifluoroethylene, the propane and the second component is 1 mass % or more and 75 mass % or less.

[23] The working fluid for the heat cycle according to [14], wherein a ratio of a total amount of the trifluoroethylene, the propane and the difluoromethane with respect to an entire amount of the working fluid for the heat cycle is over 90 mass % and 100 mass % or less, wherein a ratio of an amount of the trifluoroethylene with respect to the total amount of the trifluoroethylene, the propane and the difluoromethane is 20 mass % or more and 95 mass % or less, wherein a ratio of an amount of the propane with respect to the total amount of the trifluoroethylene, the propane and the difluoromethane is 1 mass % or more and 75 mass % or less, and wherein a ratio of an amount of the difluoromethane with respect to the total amount of the trifluoroethylene, the propane and the difluoromethane is 1 mass % or more and 75 mass % or less.

[24] The working fluid for the heat cycle according to [15], wherein a ratio of a total amount of the trifluoroethylene, the propane and the 2,3,3,3-tetrafluoropropene with respect to an entire amount of the working fluid for the heat cycle is over 90 mass % and 100 mass % or less, wherein a ratio of an amount of the trifluoroethylene with respect to the total amount of the trifluoroethylene, the propane and the 2,3,3,3-tetrafluoropropene is 20 mass % or more and 95 mass % or less, wherein a ratio of an amount of the propane with respect to the total amount of the trifluoroethylene, the propane and the 2,3,3,3-tetrafluoropropene is 1 mass % or more and 75 mass % or less, and wherein a ratio of an amount of the 2,3,3,3-tetrafluoropropene with respect to the total amount of the trifluoroethylene, the propane and the 2,3,3,3-tetrafluoropropene is 1 mass % or more and 75 mass % or less.

[25] The working fluid for the heat cycle according to [16], wherein a ratio of a total amount of the trifluoroethylene, the propane and the 1,3,3,3-tetrafluoropropene with respect to an entire amount of the working fluid for the heat cycle is over 90 mass % and 100 mass % or less, wherein a ratio of an amount of the trifluoroethylene with respect to the total amount of the trifluoroethylene, the propane and the 1,3,3,3-tetrafluoropropene is 20 mass % or more and 95 mass % or less, wherein a ratio of an amount of the propane with respect to the total amount of the trifluoroethylene, the propane and the 1,3,3,3-tetrafluoropropene is 1 mass % or more and 75 mass % or less, and wherein a ratio of an amount of the 1,3,3,3-tetrafluoropropene with respect to the total amount of the trifluoroethylene, the propane and the 1,3,3,3-tetrafluoropropene is 1 mass % or more and 75 mass % or less.

[26] A composition for a heat cycle system, comprising the working fluid for the heat cycle according to [1].

[27] A heat cycle system using the composition for the heat cycle system according to [26].

[28] The heat cycle system according to [27], wherein the heat cycle system is a refrigerating apparatus, an air-conditioning apparatus, a power generation system, a heat transport apparatus or a secondary cooling machine.

According to the present invention, it is possible to provide a working fluid for a heat cycle and a composition for a heat cycle system containing trifluoroethylene (HFO-1123), exerting excellent cycle performance held by HFO-1123, suppressing a self-decomposition property, and further having a low global warming potential.

Furthermore, according to the present invention, it is possible to provide a heat cycle system that has less effect on global warming and includes both high cycle performance and durability.

DETAILED DESCRIPTION

Figure 1:
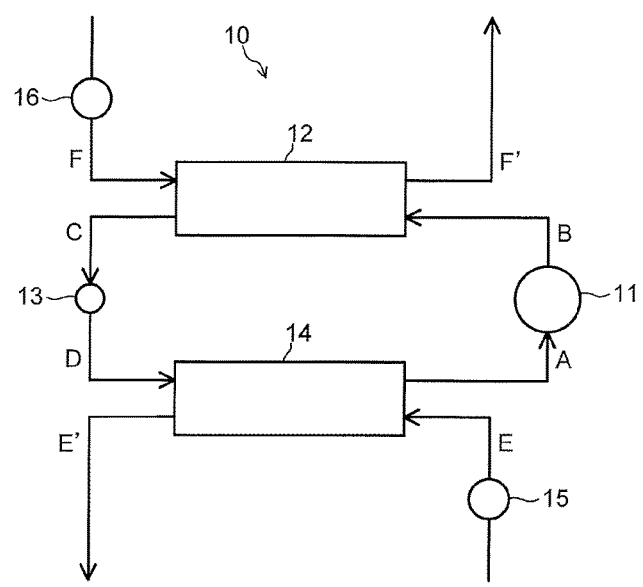
FIG. 1 is a schematic configuration diagram illustrating a refrigeration cycle system being one example of a heat cycle system of the present invention.

Hereinafter, there will be explained an embodiment of the present invention.

<Working Medium for Heat Cycle>

A working fluid for a heat cycle of this invention contains HFO-1123 and a first component. The first component is consisting of at least one of substance selected from carbon dioxide, fluoromethane (HFC-41), trifluoroiodomethane, methane, ethane, propane, helium, neon, argon, krypton, xenon, nitrogen and ammonia. In the first component, one of substance may be independently contained, or two or more of substances may be contained. The first component is a component capable of suppressing a self-decomposition property of HFO-1123 while exerting high cycle performance of HFO-1123 in the working fluid for the heat cycle when the first component is used together with HFO-1123 to be made into the working fluid for the heat cycle.

The working fluid for the heat cycle of this invention may further contain a second component. The second component is consisting of at least one of substance selected from hydrofluorocarbon other than HFC-41, and hydrofluoroolefin other than HFO-1123 having a global warming potential (GWP) of 2000 or less. In the second component, one of substance may be independently contained, or two or more of substances may be contained. The global warming potential (GWP) is a value over 100 years described in the Intergovernmental Panel on Climate Change (IPCC) Fourth Assessment Report (2007), or measured according to a method described in this report. In this specification, the GWP means this value unless otherwise stated.

(Heat Cycle System)

As a heat cycle system to which the working fluid for the heat cycle of this invention is applied, a heat cycle system having a heat exchanger such as a condenser or an evaporator is used without any particular limitation. The heat cycle system, for example, a refrigeration cycle system has a mechanism of a compressor to compress a gaseous working fluid; a condenser to obtain a high-pressured liquid by cooling; an expansion valve to lower the pressure of the high-pressured liquid; and an evaporator to make evaporation at lower temperature for removing heat by the heat of vaporization.

(HFO-1123)

Relative cycle performance (a relative coefficient of performance and a relative refrigerating capacity) of HFO-1123 contained as the working fluid for the heat cycle of this invention are illustrated in Table 1. The relative cycle performance of HFO-1123 is a relative comparison with R410A (a pseudoazeotropic mixture refrigerant of HFC-32 and HFC-125 at a mass ratio of 1:1).

TABLE 1

|  | R410A | HFO-1123 |
|---|---|---|
| Relative coefficient of performance ($RCOP_{R410A}$) | 1 | 0.91 |
| Relative refrigerating capacity ($RQ_{R410A}$) | 1 | 1.11 |
| Temperature gradient [° C.] | 0.2 | 0 |
| GWP | 2088 | 0.3 |

Here, the cycle performance is performance which is required when a working fluid for a heat cycle is applied to a heat cycle system, and it is evaluated by a coefficient of performance and a capacity. When the heat cycle system is a refrigeration cycle system, the capacity means a refrigerating capacity. The refrigerating capacity (it is also referred to as "Q" in this specification) is an output in the refrigeration cycle system. The coefficient of performance (it is also referred to as "COP" in this specification) is a value where an output (kW) is divided by motive power (kW) which is consumed to obtain the output (kW), and it corresponds to energy consumption efficiency. As the value of the coefficient of performance is higher, it becomes possible to obtain a large output by a small input. Besides, when the working fluid for the heat cycle is made up of a mixture, a temperature gradient becomes an important factor to evaluate the working fluid for the heat cycle as described later, and a value of the temperature gradient is preferably smaller.

Relative cycle performance of the working fluid for the heat cycle (with respect to R410A) is an index indicating the cycle performance of the working fluid for the heat cycle by a relative comparison with the cycle performance of R410A as a replacement object. The relative cycle performance is represented by a relative refrigerating capacity ($RQ_{410A}$) and a relative coefficient of performance ($RCOP_{R410A}$) each found according to later-described methods.

In this invention, a reference refrigeration cycle system is used to set the relative cycle performance (with respect to R410A) as the index. The reference refrigeration cycle system employs the following temperature condition in the later-described refrigeration cycle system. The relative refrigerating capacity of the working fluid for the heat cycle with respect to R410A under this condition is the relative refrigerating capacity ($RQ_{R410A}$) which is found by the following expression (X). Similarly, the relative coefficient of performance of the working fluid for the heat cycle with respect to R410A under this condition is the relative coefficient of performance ($RCOP_{R410A}$) which is found by the following expression (Y). Note that in each of the expressions (X), (Y), a sample indicates the working fluid which is to be relatively evaluated.

[Temperature Condition]

Evaporation temperature; 0° C. (note that an average temperature of an evaporation start temperature and an evaporation completion temperature in the case of a zeotropic mixture) Condensation temperature; 40° C. (note that an average temperature of a condensation start temperature and a condensation completion temperature in the case of a zeotropic mixture)

Degree of supercooling (SC); 5° C.
Degree of superheating (SH); 5° C.

[Mathematical expression 1]

$$\text{Relative refrigerating capacity } (RQ_{R419A}) = \frac{\text{Refrigerating capacity of sample } (Q_{sample})}{\text{Refrigerating capacity } R419A \ (Q_{R419A})} \quad \text{expression (X)}$$

$$\text{Relative coefficient of performance } (RCOP_{R410A}) = \frac{\text{Coefficient of performance of sample } (COP_{sample})}{\text{Coefficient of performance of } R410A \ (COP_{R410A})} \quad \text{expression (Y)}$$

(First Component)

The first component contained in the working fluid for the heat cycle of this invention is consisting of at least one of substance selected from carbon dioxide, HFC-41, trifluoroiodomethane, methane, ethane, propane, helium, neon, argon, krypton, xenon, nitrogen and ammonia. This first component functions as a working fluid and suppresses the self-decomposition property of HFO-1123.

As stated above, HFO-1123 has the self-decomposition property, and therefore, when HFO-1123 is used as the working fluid for the heat cycle in the heat cycle system, it is exposed to a state where what is called a self-decomposition reaction is likely to be induced when, for example, there is an ignition source at higher temperature or under high pressure.

In this invention, evaluation of the self-decomposition property of the working fluid for the heat cycle is performed specifically using a facility compliant with the A method recommended as a facility for measuring a combustion range of gas made by mixing gas containing halogen in an individual notification in High Pressure Gas Safety Act, according to the following method.

A sample (a working fluid for a heat cycle) is enclosed to a predetermined pressure (at a gauge pressure of 5 MPa) in a spherical pressure tight case having an internal volume of 280 $cm^3$ controlled to a predetermined temperature (130° C.) from the outside, and then energy of about 30 J is applied thereto by fusing a platinum wire installed therein. The temperature and pressure changes in the pressure tight case occurring after the application are measured, and thereby, presence of self-decomposition reaction of the sample is determined.

When remarkable pressure rise and temperature rise are recognized after the energy application compared to before the energy application, it is determined that the self-decomposition reaction of the sample occurs, that is, the sample has the self-decomposition property. On the other hand, when the remarkable pressure rise and temperature rise are not recognized before and after the energy application, it is determined that the self-decomposition reaction of the sample does not occur, that is, the sample does not have the self-decomposition property.

When the pressure after the energy application is in a range of 5 MPaG or more and 6 MPaG or less, it is said that the remarkable pressure rise is not recognized with respect to an initial pressure of 5 MPaG regarding the self-decomposition property of the sample. Besides, when the temperature after the energy application is in a range of 130° C. or more and 150° C. or less, it is said that the remarkable temperature rise is not recognized with respect to an initial temperature.

In the working fluid for the heat cycle of this invention, the first component is mixed with HFO-1123, and thereby, the self-decomposition property of HFO-1123 is suppressed. Here, the self-decomposition property of the working fluid for the heat cycle becomes higher as a content ratio of HFO-1123 in the working fluid for the heat cycle becomes larger and as the temperature and the pressure become higher. The self-decomposition property of the working fluid for the heat cycle of this invention is suppressed by adjusting a content of the first component, and it becomes possible to lower the self-decomposition property to avoid an accelerative self-decomposition reaction and problems such as heat generation, even when the working fluid is exposed to a condition causing the self-decomposition reaction of HFO-1123 such as, for example, being exposed under higher temperature and higher pressure than the above-stated condition.

Besides, all of the global warming potentials of the first components are 150 or less to be extremely lower than the global warming potential (2088) of R410A. Accordingly, the working fluid for the heat cycle of this invention has the low global warming potential in addition to including excellent durability and cycle performance by containing the first component.

Besides, a boiling point of the first component at the atmospheric pressure ($1.013 \times 10^5$ Pa) is -269° C. or more and -20° C. or less. The boiling point of the first component is in the above-stated range, and therefore, the working fluid for the heat cycle of this invention has a sufficiently small temperature gradient suitable for a practical use.

The working fluid for the heat cycle of this invention preferably contains at least one of substance selected from carbon dioxide, HFC-41, trifluoroiodomethane and propane, more preferably contains any one of substance from among carbon dioxide, HFC-41, trifluoroiodomethane or propane, and further preferably contains carbon dioxide from among the above-stated substances as the first component in terms of suppressing the self-decomposition property while obtaining the low global warming potential and the sufficiently excellent cycle performance.

In the working fluid for the heat cycle of this invention, a ratio of a total amount of HFO-1123 and the first component with respect to an entire amount of the working fluid for the heat cycle is preferably over 90 mass % and 100 mass % or less, more preferably over 92 mass % and 100 mass % or less, and further preferably over 95 mass % and 100 mass % or less in terms of obtaining the sufficiently excellent cycle performance and the low global warming potential.

In this case, a ratio of an amount of HFO-1123 with respect to the total amount of HFO-1123 and the first component is preferably 20 mass % or more and 95 mass % or less, more preferably 60 mass % or more and 80 mass % or less, and further preferably 70 mass % or more and 80 mass % or less. The ratio of HFO-1123 is 20 mass % or more, and thereby, it is possible to obtain the sufficiently excellent cycle performance, and the ratio of HFO-1123 is 95 mass % or less, and thereby, it is possible to improve suppression effect of the self-decomposition property of HFO-1123, and to suppress the self-decomposition property of the working fluid for the heat cycle under higher temperature and higher pressure conditions.

When the working fluid for the heat cycle of this invention contains carbon dioxide as the first component, a ratio of a total amount of HFO-1123 and carbon dioxide with respect to the entire amount of the working fluid for the heat cycle is preferably over 90 mass % and 100 mass % or less, more preferably over 92 mass % and 100 mass % or less, and further preferably over 95 mass % and 100 mass % or less. The ratio of the total amount of HFO-1123 and carbon dioxide is in the above-stated range, and thereby, it is possible to obtain the sufficiently excellent cycle performance and the low global warming potential.

In this case, the ratio of the amount of HFO-1123 with respect to the total amount of HFO-1123 and carbon dioxide is preferably 70 mass % or more and 95 mass % or less, and more preferably 70 mass % or more and 80 mass % or less. The ratio of HFO-1123 is 70 mass % or more, and thereby, it is possible to obtain the sufficiently excellent cycle performance, and the ratio of HFO-1123 is 95 mass % or less, and thereby, it is possible to further suppress the self-decomposition property of the working fluid for the heat cycle.

Besides, when the working fluid for the heat cycle of this invention contains HFC-41 as the first component, a ratio of a total amount of HFO-1123 and HFC-41 with respect to the entire amount of the working fluid for the heat cycle is preferably over 90 mass % and 100 mass % or less, more preferably over 92 mass % and 100 mass % or less, and further preferably over 95 mass % and 100 mass % or less. The ratio of the total amount of HFO-1123 and HFC-41 is in the above-stated range, and thereby, it is possible to obtain the sufficiently excellent cycle performance and the low global warming potential.

In this case, the ratio of the amount of HFO-1123 with respect to the total amount of HFO-1123 and HFC-41 is preferably 20 mass % or more and 80 mass % or less, and more preferably 40 mass % or more and 80 mass % or less. The ratio of HFO-1123 is 20 mass % or more, and thereby, it is possible to obtain the excellent cycle performance, and the ratio of HFO-1123 is 80 mass % or less, and thereby, it is possible to further suppress the self-decomposition property of the working fluid for the heat cycle.

When the working fluid for the heat cycle of this invention contains trifluoroiodomethane as the first component, a ratio of a total amount of HFO-1123 and trifluoroiodomethane with respect to the entire amount of the working fluid for the heat cycle is preferably over 90 mass % and 100 mass % or less, more preferably over 92 mass % and 100 mass % or less, and further preferably over 95 mass % and 100 mass % or less. The ratio of the total amount of HFO-1123 and trifluoroiodomethane is in the above-stated range, and thereby, it is possible to obtain the sufficiently excellent cycle performance and the low global warming potential.

In this case, the ratio of the amount of HFO-1123 with respect to the total amount of HFO-1123 and trifluoroiodomethane is preferably 60 mass % or more and 80 mass % or less, and more preferably 70 mass % or more and 80 mass % or less. The ratio of HFO-1123 is 60 mass % or more, and thereby, it is possible to obtain the sufficiently excellent cycle performance, and the ratio of HFO-1123 is 80 mass % or less, and thereby, it is possible to further suppress the self-decomposition property of the working fluid for the beat cycle.

When the working fluid for the heat cycle of this invention contains propane as the first component, a ratio of a total amount of HFO-1123 and propane with respect to the entire amount of the working fluid for the beat cycle is preferably over 90 mass % and 100 mass % or less, more preferably over 92 mass % and 100 mass % or less, and further preferably over 95 mass % and 100 mass % or less. The ratio of the total amount of HFO-1123 and propane is in the above-stated range, and thereby, it is possible to obtain the sufficiently excellent cycle performance and the low global warming potential.

In this case, the ratio of the amount of HFO-1123 with respect to the total amount of HFO-1123 and propane is preferably 20 mass % or more and 95 mass % or less, and more preferably 20 mass % or more and 80 mass % or less. The ratio of HFO-1123 is 20 mass % or more, and thereby, it is possible to obtain the sufficiently excellent cycle performance, and the ratio of HFO-1123 is 95 mass % or less, and thereby, it is possible to further suppress the self-decomposition property of the working fluid for the heat cycle.

(Second Component)

The second component which may be contained in the working fluid for the heat cycle of this invention is consisting of at least one of substance selected from hydrofluorocarbon (HFC) other than HFC-41 and hydrofluoroolefin (HFO) other than HFO-1123 having the global warming potential (100 years) in the Intergovernmental Panel on Climate Change (IPCC) Fourth Assessment Report of 2000 or less. The second component is a component having a function of, for example, improving the cycle performance of the working fluid for the heat cycle, a function of lowering the global warming potential, and a function of reducing the temperature gradient, and the second component enables to keep a good balance of properties of the working fluid for the heat cycle.

Besides, the second component has a function of reducing the self-decomposition reaction of the working fluid for the heat cycle by lowering the content ratio of HFO-1123 in the working fluid for the heat cycle, and the global warming potential thereof is also lower than that of R410A. The second component is further used in combination with HFO-1123 and the first component, and thereby, it is possible to obtain the working fluid for the heat cycle where the self-decomposition property is suppressed, and the balance between the cycle performance and the global warming potential is excellent.

As the second component, the relative refrigerating capacity ($RQ_{R410A}$) found by the expression (X) is preferably 0.6 or more, and more preferably 0.8 or more so as to improve the cycle performance. Besides, the relative coefficient of performance ($RCOP_{R410A}$) found by the expression (Y) is preferably 0.5 or more, and more preferably 0.65 or more.

As the second component, there can be concretely cited 2,3,3,3-tetrafluoropropene (HFO-1234yf), 1,3,3,3-tetrafluoropropene (HFO-1234ze), difluoromethane (HFC-32), 1,1,1,2-tetrafluoroethane (HFC-134a), HFC-125, 1,2-difluoroethane (HFC-152), and so on.

The working fluid for the heat cycle of this invention preferably contains at least one selected from HFO-1234yf, HFO-1234xe and HFC-32, and more preferably contains HFC-32 from among the above as the second component so as to improve the cycle performance, to suppress the self-decomposition property, and to further lower the global warming potential.

Besides, the working fluid for the heat cycle of this invention preferably contains at least one of substance selected from carbon dioxide, HFC-41, trifluoroiodomethane and propane as the first component, and contains at least one of substance selected from HFO-1234yf, HFO-1234ze and HFC-32 as the second component, and more preferably contains carbon dioxide as the first component, and contains at least one of substance selected from HFO-1234yf, HFO-1234ze and HFC-32 as the second component so as to obtain the lower global warming potential and to improve the cycle performance.

When the working fluid for the heat cycle of this invention contains the second component, a ratio of a total amount of HFO-1123, the first component and the second component with respect to the entire amount of the working fluid for the heat cycle is preferably over 90 mass % and 100 mass % or less, more preferably over 92 mass % and 100 mass % or less, and further preferably over 95 mass % and 100 mass % or less. The ratio of the total amount of HFO-1123, the first component and the second component is in the above-stated range, and thereby, it is possible to suppress the self-decomposition property of the working fluid for the heat cycle, to obtain the low global warming potential, and to improve the cycle performance.

In this case, it is preferable that the ratio of the amount of HFO-1123 is 10 mass % or more and 90 mass % or less, a ratio of an amount of the first component is 1 mass % or more and 50 mass % or less and a ratio of an amount of the second component is 1 mass % or more and 70 mass % or less, and it is more preferable that the ratio of the amount of HFO-1123 is 20 mass % or more and 80 mass % or less, the ratio of the amount of the first component is 20 mass % or more and 50 mass % or less and the ratio of the amount of the second component is 1 mass % or more and 29 mass % or less with respect to the total amount of HFO-1123, the first component and the second component, so as to obtain the working fluid for the heat cycle having the further lower global warming potential.

When the working fluid for the heat cycle of this invention contains carbon dioxide as the first component, a ratio of a total amount of HFO-1123, carbon dioxide and the second component with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 10 mass % or more and 90 mass % or less, a ratio of an amount of carbon dioxide is 1 mass % or more and 50 mass % or less and a ratio of an amount of the second component is 1 mass % or more and 70 mass % or less, and it is more preferable that the ratio of the amount of HFO-1123 is 20 mass % or more and 80 mass % or less, the ratio of the amount of carbon dioxide is 20 mass % or more and 30 mass % or less and the ratio of the amount of the second component is 1 mass % or more and 29 mass % or less with respect to the total amount of HFO-1123, carbon dioxide and the second component, so as to obtain the working fluid for the heat cycle where the self-decomposition property is suppressed, and the balance between the cycle performance and the global warming potential is excellent.

Further, when the working fluid for the heat cycle of this invention contains carbon dioxide as the first component and HFC-32 as the second component, a ratio of a total amount of HFO-1123, carbon dioxide and HFC-32 with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 10 mass % or more and 90 mass % or less, the ratio of the amount of carbon dioxide is 1 mass % or more and 50 mass % or less and a ratio of an amount of HFC-32 is 1 mass % or more and 29 mass % or less, and it is more preferable that the ratio of the amount of HFO-1123 is 10 mass % or more and 80 mass % or less, the ratio of the amount of carbon dioxide is 20 mass % or more and 50 mass % or less and the ratio of the amount of HFC-32 is 1 mass % or more and 29 mass % or less with respect to the total amount of HFO-1123, carbon dioxide and HFC-32, so as to obtain the working fluid for the heat cycle having the further lower global warming potential. Content ratios of HFO-1123, carbon dioxide and HFC-32 are in the above-stated ranges, and thereby, it is possible to obtain the working fluid for the heat cycle having the global warming potential of for example, 200 or less.

Further, when the working fluid for the heat cycle of this invention contains carbon dioxide as the first component and HFO-1234yf as the second component, a ratio of a total amount of HFO-1123, carbon dioxide and HFO-1234yf with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 10 mass % or more and 90 mass % or less, the ratio of the amount of carbon dioxide is 1 mass % or more and 50 mass % or less and a ratio of an amount of HFO-1234yf is 1 mass % or more and 70 mass % or less, and it is more preferable that the ratio of the amount of HFO-1123 is 10 mass % or more and 80 mass % or less, the ratio of the amount of carbon dioxide is 20 mass % or more and 50 mass % or less and the ratio of the amount of HFO-1234yf is 1 mass % or more and 70 mass % or less with respect to the total amount of HFO-1123, carbon dioxide and HFO-1234yf, so as to obtain the working fluid for the heat cycle having the further excellent cycle performance.

Further, when the working fluid for the heat cycle of this invention contains carbon dioxide as the first component and HFO-1234ze as the second component, a ratio of a total amount of HFO-1123, carbon dioxide and HFO-1234ze with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 10 mass % or more and 90 mass % or less, the ratio of the amount of carbon dioxide is 1 mass % or more and 50 mass % or less and a ratio of an amount of HFO-1234ze is 1 mass % or more and 70 mass % or less, and it is more preferable that the ratio of the amount of HFO-1123 is 10 mass % or more and 80 mass % or less, the ratio of the amount of carbon dioxide is 20 mass % or more and 50 mass % or less and the ratio of the amount of HFO-1234ze is 1 mass % or more and 70 mass % or less with respect to the total amount of HFO-1123, carbon dioxide and HFO-1234ze, so as to obtain the working fluid for the heat cycle having the further excellent cycle performance.

When the working fluid for the heat cycle of this invention contains propane as the first component, a ratio of a total amount of HFO-1123, propane and the second component with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 20 mass % or more and 95 mass % or less, a ratio of an amount of propane is 1 mass % or more and 75 mass % or less and the ratio of the amount of the second component is 1 mass % or more and 75 mass % or less, and it is more preferable that the ratio of the amount of HFO-1123 is 20 mass % or more and 80 mass % or less, the ratio of the amount of propane is 5 mass % or more and 50 mass % or less and the ratio of the amount of the second component is 5 mass % or more and 50 mass % or less with respect to the total amount of HFO-1123, propane and the second component, so as to obtain the working fluid for the heat cycle where the self-decomposition property is suppressed, and the balance between the cycle performance and the global warming potential is excellent.

Further, when the working fluid for the heat cycle of this invention contains propane as the first component and HFC-32 as the second component, a ratio of a total amount of HFO-1123, propane and HFC-32 with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 20 mass % or more and 95 mass % or less, the ratio of the amount of propane is 1 mass % or more and 75 mass % or less and a ratio of an amount of HFC-32 is 1 mass % or more and 75 mass % or less, and it is more preferable that the ratio of the amount of HFO-1123 is 20 mass % or more and 8 mass % or less, the ratio of the amount of propane is 5 mass % or more and 50 mass % or less and the ratio of the amount of HFC-32 is 5 mass % or more and 50 mass % or less with respect to the total amount of HFO-1123, propane and HFC-32, so as to obtain the working fluid for the heat cycle having the further lower global warming potential. Content ratios of HFO-1123, propane and HFC-32 are in the above-stated ranges, and thereby, it is possible to obtain the working fluid for the heat cycle having the global warming potential of, for example, 350 or less.

Further, when the working fluid for the heat cycle of this invention contains propane as the first component and HFO-1234yf as the second component, a ratio of a total amount of HFO-1123, propane and HFO-1234yf with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 20 mass % or more and 95 mass % or less, the ratio of the amount of propane is 1 mass % or more and 75 mass % or less and a ratio of an amount of HFO-1234yf is 1 mass % or more and 75 mass % or less, and it is more preferable that the ratio of the amount of HFO-1123 is 20 mass % or more and 80 mass % or less, the ratio of the amount of propane is 5 mass % or more and 50 mass % or less and the ratio of the amount of HFO-1234yf is S mass % or more and 50 mass % or less with respect to the total amount of HFO-1123, propane and HFO-1234yf, so as to obtain the working fluid for the heat cycle having the further excellent cycle performance.

Further, when the working fluid for the heat cycle of this invention contains propane as the first component and HFO-1234ze as the second component, a ratio of a total amount of HFO-1123, propane and HFO-1234ze with respect to the entire amount of the working fluid for the heat cycle is preferably over 90 mass % and 100 mass % or less, more preferably over 92 mass % and 100 mass % or less, and further preferably over 95 mass % and 100 mass % or less.

In this case, it is preferable that the ratio of the amount of HFO-1123 is 20 mass % or more and 95 mass % or less, the ratio of the amount of propane is 1 mass % or more and 75 mass % or less and a ratio of an amount of HFO-1234ze is 1 mass % or more and 75 mass % or less, and it is more preferable that the ratio of the amount of HFO-1123 is 20 mass % or more and 80 mass % or less, the ratio of the amount of propane is 5 mass % or more and 50 mass % or less and the ratio of the amount of HFO-1234ze is 5 mass % or more and 50 mass % or less with respect to the total amount of HFO-1123, propane and HFO-1234ze, so as to obtain the working fluid for the heat cycle having the further excellent cycle performance.

(Optional Component)

The working fluid for the heat cycle of this invention may optionally contain a compound which is normally used as a working fluid in addition to HFO-1123, the first component and the second component in a range not impairing effect of this invention. As such optional compounds (optional components), there can be cited, for example, HFC, HFO (fluorohydrocarbon having a carbon-carbon double bond) other than HFO-1123, the first component and the second component contained according to need, other components to be vaporized or liquefied together with HFO-1123 other than the above, and so on. The optional component is preferred to be HFC, HFO other than HFO-1123, the first component and the second component. One of substance may be used independently, or two or more of substances may be used in combination as the optional component.

The optional component is preferred to be a compound capable of keeping the global warming potential and the temperature gradient in acceptable ranges while having a function to further improve the above-described relative coefficient of performance and relative refrigerating capacity, when used for the heat cycle system in combination with HFO-1123. When the working fluid for the heat cycle contains such a compound in combination with HFO-1123, more favorable cycle performance can be obtained while keeping the low global warming potential, and effect by the temperature gradient is also small.

The optional component is preferred to be selected from the above-described viewpoints. As HFC as the optional component, there can be cited 1,1-difluoroethane (HFC-152a) trifluoroethane, 1,1,2,2-tetrafluoroethane (HFC-134), pentafluoropropane, hexafluoropropane, heptafluoropropane, pentafluorobutane, heptafluorocyclopentane, and so on. As HFO, there can be cited 1,2-difluoroethylene (HFO-1132), 2-fluoropropene (HFO-1261yf), 1,1,2-trifluoropropene (HFO-1243yc), 1,2,3,3,3-pentafluoropropene (HFO-1225ye), 3,3,3-trifluoropropene (HFO-1243zf), and so on.

Besides, as the optional component other than the above-stated f-FC and HFO, there can be cited: hydrocarbon such as propylene, cyclopropane, butane, isobutane, pentane, isopentane; chlorofluoropropene (CFO) such as 1,1-dichloro-2,3,3,3-tetrafluoropropene (CFO-1214ya), 1,3-dichloro-1,2,3,3-tetrafluoropropene (CFO-1214yb), 1,2-dichloro-1,2-difluoroethylene (CFO-1112); hydrochlorofluoroolefin (HCFO) such as 1-chloro-2,3,3,3-tetrafluoropropene (HCFO-1224yd), 1-chloro-1,2-difluoroethylene (HCFO-1122), and soon. The optional component is preferred to be a component exerting less effect on the ozone layer and less effect on global warming.

When the working fluid for the heat cycle of this invention contains the above-described optional components, a total content of the optional components in the working fluid for the heat cycle is preferably less than 10 mass %, more preferably 8 mass % or less, and further preferably 5 mass % or less with respect to 100 mass % of the working fluid for the heat cycle.

(Temperature Gradient)

When the working fluid for the heat cycle contains an optional component, the working fluid for the heat cycle has a considerable temperature gradient except for the case where HFO-1123 and the optional component form an azeotropic composition. The temperature gradient of the working fluid for the heat cycle varies depending on a type of the optional component and a mixing ratio of HFO-1123 and the optional component.

When a mixture is used as the working fluid for the heat cycle, an azeotropic mixture or a pseudoazeotropic mixture such as R410A is preferably used ordinarily. A non-azeotropic composition has a problem of undergoing a composition change when put into a refrigerating and air-conditioning apparatus from a pressure container. Further, when a refrigerant leaks out of a refrigerating and air-conditioning apparatus, a refrigerant composition in the refrigerating and air-conditioning apparatus is highly likely to change, resulting in difficulty in recovery of the refrigerant composition to an initial state. On the other hand, the above-described problems can be avoided as long as the working fluid for the heat cycle is an azeotropic or pseudoazeotropic mixture.

As an index to measure applicability of the mixture to the working fluid for the heat cycle, the "temperature gradient" is commonly employed. The temperature gradient is defined as properties that an initiation temperature and a completion temperature of a heat exchanger, for example, of evaporation in an evaporator or of condensation in a condenser differ from each other. The temperature gradient of the azeotropic mixture is "0" (zero), and as for the pseudoazeotropic mixture, like the temperature gradient of R410A being 0.2, for example, the temperature gradients of the azeotropic mixture and the pseudoazeotropic mixture are extremely close to "0" (zero).

When the temperature gradient of the working fluid for the heat cycle is large, it is a problem because, for example, an inlet temperature of an evaporator decreases, to make frosting more likely to occur. Further, in the heat cycle system, in order to improve heat exchange efficiency, it is common to pass the working fluid for the heat cycle flowing in a heat exchanger and a heat source fluid such as water or the air in counterflow. Then, the temperature difference of the heat source fluid is small in a stable operation state. Therefore, it is difficult to obtain a heat cycle system with good energy efficiency when the working fluid for the heat cycle is a non-azeotropic composition with a large temperature gradient. Accordingly, when the mixture is used as the working fluid for the heat cycle, the working fluid for the heat cycle with an appropriate temperature gradient is desired.

(Global Warming Potential)

The working fluid for the heat cycle of this invention preferably has the global warming potential (GWP) of 250 or less, and more preferably has that of 200 or less from a viewpoint of effect on the global warming. Here, the GWP in the mixture is represented as a weighted average by composition masses of components.

(Relative Cycle Performance)

The relative coefficient of performance of the working fluid for the heat cycle of this invention is preferably 0.65 or more, and more preferably 0.8 or more so as to obtain the sufficient cycle performance. Besides, the relative refrigerating capacity is preferably 0.5 or more, and more preferably 0.8 or more.

[Composition for Heat Cycle System]

The working fluid for the heat cycle of this invention can be normally mixed with a refrigerant oil, when applied to the heat cycle system, and used as a composition for the heat cycle system of this invention. The composition for the heat cycle system of this invention containing the working fluid for the heat cycle of this invention and the refrigerant oil may contain publicly-known additives such as a stabilizer and a leakage detection material in addition to them.

(Refrigerant Oil)

As the refrigerant oil, a publicly-known refrigerant oil conventionally used in the composition for the heat cycle system together with the working fluid composed of halogenated hydrocarbon can be employed without any limitation. As the refrigerant oil, there can be concretely cited an oxygen-containing synthetic oil (ester-based refrigerant oil, ether-based refrigerant oil and the like), a fluorine-based refrigerant oil, a mineral-based refrigerant oil, a hydrocarbon-based synthetic oil, and the like.

As the ester-based refrigerant oil, there can be cited a dibasic acid ester oil, a polyol ester oil, a complex ester oil, a polyol carbonate ester oil, and the like.

As the dibasic acid ester oil, esters of dibasic acids with 5 to 10 carbons (a glutaric acid, an adipic acid, a pimelic acid, a suberic acid, an azelaic acid, a sebacic acid and the like), with monohydric alcohols with 1 to 15 carbons having a linear or branched alkyl group (methanol, ethanol, propanol, butanol, pentanol, hexanol, heptanol, octanol, nonanol, decanol, undecanol, dodecanol, tridecanol, tetradecanol, pentadecanol, and the like) are preferable. As the dibasic acid ester oil, there can be concretely cited glutaric acid ditridecyl, di-2-ethylhexy adipate, di-isodecyl adipate, di-tridecyl adipate, di-3-ethylhexyl sebacate, and the like.

As the polyol ester oil, esters of diols (ethylene glycol, 1,3-propanediol, propylene glycol, 1,4-butanediol, 1,2-butanediol, 1,5-pentanediol, neopentyl glycol, 1,7-heptanediol, 1,12-dodecanediol, and the like) or polyols with 3 to 20 hydroxyl groups (trimethylol ethane, trimethylolpropane, trimethylolbutane, pentaerythritol, glycerin, sorbitol, sorbitan, sorbitol-glycerine condensate, and the like), with fatty acids with 6 to 20 carbons (linear or branched fatty acids such as a hexanoic acid, a heptanoic acid, an octanoic acid, a nonanoic acid, a decanoic acid, an undecanoic acid, a dodecanoic acid, an eicosanoic acid, an oleic acid, and the like or a what is called a neo acid with a quaternary a carbon atom, or the like) are preferable. Note that these polyol ester oils may have a free hydroxyl group.

As the polyol ester oil, esters (trimethylotpropane tripelargonate, pentaerythritol-2-ethylhexanoate, pentaerythritol tetrapelargonate, and the like) of hindered alcohols (neopentyl glycol, trimethylolethane, trimethylolpropane, trimethylolbutane, pentaerythritol, and the like) are preferable.

The complex ester oil is an ester of a fatty acid and a dibasic acid with a monohydric alcohol and a polyol. As the fatty acid, dibasic acid, monohydric alcohol, and polyol, the same as those described above can be used.

The polyol carbonate ester oil is an ester of a carbonic acid and a polyol. As polyol, there can be cited the diols similar to the above and the polyols similar to the above. Further, the polyol carbonate ester oil may be a ring-opening polymer of cyclic alkylenecarbonate.

As the ether-based refrigerant oil, there can be cited a polyvinylether oil and a polyoxyalkylene oil.

As the polyvinylether oil, there are the one obtained by polymerizing a vinyl ether monomer such as alkyl vinyl ether, and a copolymer obtained by copolymerizing a vinyl ether monomer and a hydrocarbon monomer having an olefinic double bond.

As for the vinyl ether monomer, one may be used independently, or two or more may be used in combination.

As the hydrocarbon monomer having the olefinic double bond, there can be cited ethylene, propylene, butenes, pentenes, hexenes, heptenes, octenes, diisobutylene, triisobutylene, styrene, α-methylstyrene, alkyl-substituted styrenes and the like. As for the hydrocarbon monomer having the olefinic double bond, one may be used independently, or two or more may be used in combination.

The polyvinylether copolymer may be either a block or random copolymer. As for the polyvinylether oil, one may be used independently, or two or more may be used in combination.

As the polyoxyalkylene oil, there can be cited polyoxyalkylene monool, polyoxyalkylene polyol, alkyl etherified polyoxyalkylene monool and polyoxyalkylene polyol, esterified polyoxyalkylene monool and polyoxyalkylene polyol, and the like.

As polyoxyalkylene monool and polyoxyalkylene polyol, there can be cited those obtained by a method of subjecting alkylene oxides with 2 to 4 carbons (ethylene oxide, propylene oxide, and the like) to ring opening addition polymerization to an initiator such as water or a hydroxyl group-containing compound in the presence of a catalyst such as an alkali hydroxide. Further, the oxyalkylene units in a polyoxyalkylene chain may be the same in one molecule or two or more of oxyalkylene units may be contained. It is preferable that at least the oxpropylene unit is contained in one molecule.

As the initiator used for reaction, there can be cited water, monohydric alcohols such as methanol, butanol and the like, and polyhydric alcohols such as ethylene glycol, propylene glycol, pentaerythritol, glycerol, and the like.

As the polyoxyalkylene oil, alkyl etherified or esterified polyoxyalkylene monool and polyoxyalkylene polyol are preferable. Further, as the polyoxyalkylene polyol, polyoxyalkylene glycol is preferable. In particular, alkyl etherified polyoxyalkylene glycol, called a polyglycol oil, having a hydroxyl group at its terminal capped with an alkyl group such as a methyl group is preferable.

As the fluorine-based refrigerant oil, there can be cited a compound made by replacing a hydrogen atom of a synthetic oil (later-described mineral oil, poly-α-olefin, alkylbenzene, alkylnaphthalene, or the like) with a fluorine atom, a perfluoropolyether oil, a fluorinated silicone oil, and the like.

As the mineral-based refrigerant oil, there can be cited a paraffin-based mineral oil, a naphthene-based mineral oil, and the like made by refining a refrigerant oil distillate obtained by subjecting a crude oil to atmospheric distillation or vacuum distillation, the refining is made appropriately in combination of refining treatments (solvent deasphalting, solvent extraction, hydrogenolysis, solvent dewaxing, catalytic dewaxing, hydrogenation refining, clay treatment, and the like).

As the hydrocarbon-based synthetic oil, there can be cited poly-α-olefin, alkylbenzene, alkylnaphthalene, and the like.

As for the refrigerant oil, one may be used independently, or two or more may be used in combination.

As the refrigerant oil, one or more selected from the polyolester oil, the polyvinylether oil, and the polyglycol oil are preferable in terms of compatibility with the working fluid for the heat cycle.

A content of the refrigerant oil in the composition for the heat cycle system only needs to fall in a range not significantly decreasing the effects of this invention, and is preferably 10 parts by mass or more and 100 parts by mass or less, and more preferably 20 parts by mass or more and 50 parts by mass or less with respect to 100 parts by mass of the working fluid for the heat cycle.

(Additives)

The stabilizer which is optionally contained in the composition for the heat cycle system is a component for improving stability of the working fluid for the heat cycle against heat and oxidation. As the stabilizer, a publicly-known stabilizer used for the heat cycle system, for example, an oxidation resistance improver, a heat resistance improver, a metal deactivator or the like can be employed together with the working fluid conventionally composed of halogenated hydrocarbon without any limitation.

As the oxidation resistance improver and the heat resistance improver, there can be cited N,N'-diphenyl-phenylenediamine, p-octyldiphenylamine, p,p'-dioctyldiphenylamine, N-phenyl-1-naphthylamine, N-phenyl-2-naphthylamine, N-(p-dodecyl)phenyl-2-naphthylamine, di-1-naphthylamine, di-2-naphthylamine, N-alkylphenothiazine, 6-(t-butyl)phenol, 2,6-di-(t-butyl)phenol, 4-methyl-2,6-di-(t-butyl)phenol, 4,4'-methylenebis(2,6-di-t-butylphenol), and the like. As for the oxidation resistance improver and the heat resistance improver, one may be used independently, or two or more may be used in combination.

As the metal deactivator, there can be cited imidazole, benzimidazole, 2-mercaptobenzothiazole, 2,5-dimethylcaptothiadiazole, salicylidine-propylenediamine, pyrazole, benzotriazole, tolutriazole, 2-methylbenzamidazole, 3,5-dimethylpyrazole, methylenebis-benzotriazole, organic acids or their esters, primary, secondary or tertiary aliphatic amine, an amine salt of an organic acid or an inorganic acid, a heterocyclic nitrogen containing compound, an amine salt of alkyl acid phosphate or their derivatives, and the like.

A content of the stabilizer in the composition for the heat cycle system only needs to fall in a range not significantly decreasing the effects of this invention, and is preferably 5 parts by mass or less, and more preferably 1 part by mass or less with respect to 100 parts by mass of the working fluid for the heat cycle.

As the leakage detection material which is optionally contained in the composition for the heat cycle system, there can be cited an ultraviolet fluorescence dye, an odor gas, an odor masking agent, and the like.

As the ultraviolet fluorescence dye, there can be cited publicly-known ultraviolet fluorescence dyes used for the heat cycle system together with the working fluid conventionally composed of halogenated hydrocarbon, such as those disclosed in U.S. Pat. No. 4,249,412, Japanese Translation of PCT International Application Publication No 1110-502737, Japanese Translation of PCT International Application Publication No. 2007-511645, Japanese Translation of PCT International Application Publication No. 2008-500437, and Japanese Translation of PCT International Application Publication No. 2008-531836.

As the odor masking agent, there can be cited publicly-known aroma chemicals used for the heat cycle system together with the working fluid conventionally composed of halogenated hydrocarbon, such as those disclosed in Japanese Translation of PCT International Application Publication No. 2008-500437 and Japanese Translation of PCT International Application Publication No. 2008-531836.

In the case of using the leakage detection material, a solubilizing agent for improving the solubility of the leakage detection material to the working fluid for the heat cycle may be used.

As the solubilizing agent, there can be cited those disclosed in Japanese Translation of PCT International Application Publication No. 2007-511645, Japanese Translation of PCT International Application Publication No. 2008-500437, and Japanese Translation of PCT International Application Publication No. 2008-531836, and so on.

A content of the leakage detection material in the composition for the heat cycle system only needs to fall in a range not significantly decreasing the effects of this invention, and is preferably 2 parts by mass or less, and more preferably 0.5 parts by mass or less with respect to 100 parts by mass of the working fluid for the heat cycle.

[Heat Cycle System]

The heat cycle system of this invention is a system using the composition for the heat cycle system of this invention. The heat cycle system of this invention may be a heat pump system utilizing heat obtained by a condenser or may be a refrigeration cycle system utilizing coldness obtained by an evaporator.

As the heat cycle system of this invention, there can be concretely cited a refrigerating apparatus, an air-conditioning apparatus, a power generation system, a heat transport apparatus, a secondary cooling machine, and so on. Among them, the heat cycle system of this invention is preferably used as an air-conditioning apparatus to be often disposed outdoors or the like due to being able to stably and safely exhibit heat cycle performance even in a high-temperature working environment. Further, the heat cycle system of this invention is preferably used also as a refrigerating apparatus.

As the air-conditioning apparatus, there can be concretely cited a room air-conditioner, packaged air-conditioners (such as a store packaged air-conditioner, a building packaged air-conditioner, and a plant packaged air-conditioner), a gas engine heat pump, a train air-conditioning system, an automobile air-conditioning system, and so on.

As the refrigerating apparatus, there can be concretely cited showcases (such as a built-in showcase and a separate showcase), an industrial fridge-freezer, a vending machine, an ice making machine, and so on.

As the power generation system, a power generation system by Rankine cycle system is preferred. As the power generation system, there can be concretely cited as an example a system in which in an evaporator, a working fluid is heated by geothermal energy, solar heat, waste heat in a medium-to-high temperature range at about 50° C. or more and 200° C. or less, or the like, the vaporized working fluid in a high temperature and high pressure state is adiabatically expanded by an expansion device, and a power generator is driven by the work generated by the adiabatic expansion to thereby perform power generation.

As the heat transport apparatus, a latent heat transport apparatus is preferred. As the latent heat transport apparatus, there can be cited a heat pipe conducting latent heat transport utilizing a phenomenon such as evaporation, boiling, or condensation of a working fluid filled in an apparatus and a two-phase closed thermosiphon apparatus. The heat pipe is applied to a relatively small-sized cooling apparatus such as a cooling apparatus of a heat generation part of a semiconductor element and electronic equipment. The two-phase closed thermosiphon apparatus is widely utilized for a gas/gas heat exchanger, accelerating snow melting and preventing freezing of roads, and the like because it does not require a wick and its structure is simple.

FIG. 1 is a schematic configuration diagram illustrating a refrigeration cycle system being one example of the heat cycle system of this invention. Hereinafter, methods to find the refrigerating capacity and the coefficient of performance of a working fluid for a predetermined heat cycle are described by using the refrigeration cycle system illustrated in FIG. 1.

As illustrated in FIG. 1, a refrigeration cycle system 10 includes: a compressor 11 that compresses a vapor A of the working fluid for the heat cycle to make it into a vapor B of the working fluid for the heat cycle at high temperature and high pressure; a condenser 12 that cools and liquefies the vapor B of the working fluid for the heat cycle emitted from the compressor 11 to make it into a working fluid for a heat cycle C at low temperature and high pressure; an expansion valve 13 that expands the working fluid for the heat cycle C emitted from the condenser 12 to make it into a working fluid for a heat cycle D at low temperature and low pressure; an evaporator 14 that heats the working fluid for the heat cycle D emitted from the expansion valve 13 to make it into the vapor A of the working fluid for the heat cycle at high temperature and low pressure; a pump 15 that supplies a load fluid E to the evaporator 14; and a pump 16 that supplies a fluid F to the condenser 12.

In the refrigeration cycle system 10, (i) to (iv) cycles (refrigeration cycle) below are repeated.

(i) Compressing the vapor A of the working fluid for the heat cycle emitted from the evaporator 14 in the compressor 11 to make it into the vapor B of the working fluid for the heat cycle at high temperature and high pressure. Hereinafter, it is referred to as an "AB process".

(ii) Cooling and liquefying the vapor B of the working fluid for the heat cycle emitted from the compressor 11 by the fluid F in the condenser 12 to make it into the working fluid for the heat cycle C at low temperature and high pressure. In this event, the fluid F is heated to be made into a fluid P and emitted from the condenser 12. Hereinafter, it is referred to as a "BC process".

(iii) Expanding the working fluid for the heat cycle C emitted from the condenser 12 in the expansion valve 13 to make it into the working fluid for the heat cycle D at low temperature and low pressure. Hereinafter, it is referred to as a "CD process".

(iv) Heating the working fluid for the heat cycle D emitted from the expansion valve 13 by the load fluid E in the evaporator 14 to make it into the vapor A of the working fluid for the heat cycle at high temperature and low pressure. In this event, the load fluid E is cooled to be made into a load fluid E and emitted from the evaporator 14. Hereinafter, it is referred to as a "DA process".

Figure 2:
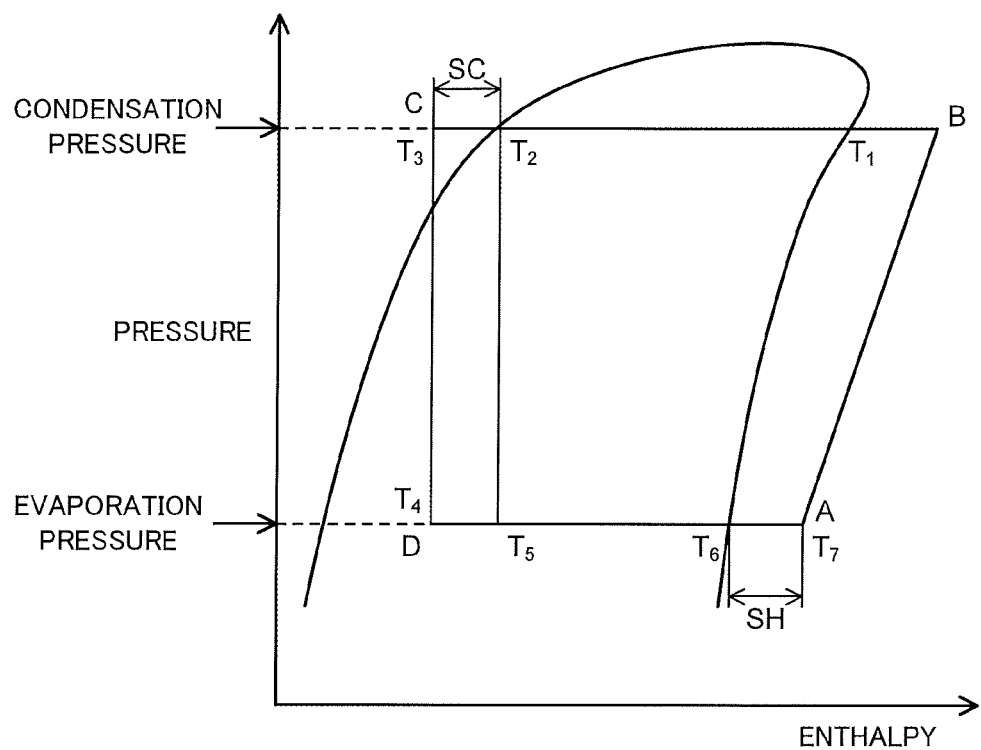
FIG. 2 is a cycle chart illustrating change of state of a working fluid for a heat cycle in the refrigeration cycle system in FIG. 1 on a pressure-enthalpy line diagram.

The refrigeration cycle system 10 is a cycle system achieved by an adiabatic and isoentropic change, an isenthalpic change, and an isobaric change. FIG. 2 is a cycle chart illustrating change of state of the working fluid for the heat cycle in the refrigeration cycle system 10 in FIG. 1 on a pressure-enthalpy line diagram. The change of state of the working fluid for the heat cycle can be expressed as a trapezoid having A, B, C. and D as vertices when the change is illustrated on the pressure-enthalpy line (curve) diagram illustrated in FIG. 2.

The AB process is a process of performing adiabatic compression in the compressor 11 to make the vapor A of the working fluid for the heat cycle at high temperature and low pressure into the vapor B of the working fluid for the heat cycle at high temperature and high pressure, and is indicated by an AB line in FIG. 2. As will be described later, the vapor A of the working fluid for the heat cycle is introduced, in a superheated state, into the compressor 11, and therefore the vapor B of the working fluid for the heat cycle to be obtained therein is vapor also in the superheated state. A compressor discharge gas pressure (a discharge pressure) is a pressure in the state of B in FIG. 2, and is the highest pressure in the refrigeration cycle. Note that a temperature of the state of B in FIG. 2 is a compressor discharge gas temperature (a discharge temperature), and is the highest temperature in the refrigeration cycle.

The BC process is a process of performing isobaric cooling in the condenser 12 to make the vapor B of the working fluid for the heat cycle at high temperature and high pressure into the working fluid for the heat cycle C at low temperature and high pressure, and is indicated by a BC line in FIG. 2. The pressure in this event is the condensation pressure. An intersection point $T_1$ on a high enthalpy side of intersection points of the pressure-enthalpy line and the BC line is a condensation temperature, and an intersection point $T_2$ on a low enthalpy side is a condensation boiling temperature.

The CD process is a process of performing isenthalpic expansion in the expansion valve 13 to make the working fluid for the heat cycle C at low temperature and high pressure into the working fluid for the heat cycle D at low temperature and low pressure, and is indicated by a CD line in FIG. 2. Incidentally, when the temperature of the working fluid for the heat cycle C at low temperature and high pressure is indicated by a temperature $T_3$, $T_2$-$T_3$ is a degree of supercooling (SC) of the working fluid for the heat cycle in the cycles of (i) to (iv).

The DA process is a process of performing isobaric heating in the evaporator 14 to return the working fluid for the heat cycle D at low temperature and low pressure to the vapor A of the working fluid for the heat cycle at high temperature and low pressure, and is indicated by a DA line in FIG. 2. The pressure in this event is the evaporation pressure. An intersection point $T_6$ on a high enthalpy side of intersection points of the pressure-enthalpy line and the DA line is an evaporation temperature. When the temperature of the vapor A of the working fluid for the heat cycle is indicated by a temperature $T_7$, $T_7$-$T_6$ is a degree of superheating (SH) of the working fluid for the heat cycle in the cycles of (i) to (iv). Incidentally, $T_4$ indicates the temperature of the working fluid for the heat cycle D.

Here, Q and COP of the working fluid for the heat cycle are found by the following expressions (1) and (2) respectively by using enthalpies $h_A$, $h_B$, $h_C$, and $h_D$ in respective states A (after evaporation, high temperature and low pressure), B (after compression, high temperature and high pressure), C (after condensation, low temperature and high pressure), and D (after expansion, low temperature and low pressure) of the working fluid for the heat cycle. Note that it is assumed that there is no loss due to equipment efficiency and no pressure loss in pipes and heat exchangers.

The thermodynamic property required for calculation of the cycle performance of the working fluid for the heat cycle can be calculated based on a generalized state equation (Soave-Reclich-Kwong equation) based on a principle of corresponding states, and on thermodynamic relational expressions. When the characteristic value cannot be obtained, calculation is performed using an estimation method based on an atomic group contribution method.

$$Q = h_A - h_D \qquad \text{expression (1)}$$

$$\text{COP} = Q/\text{compression work} = (h_A - h_D)/(h_B - h_A) \qquad \text{expression (2)}$$

Q expressed by the above ($h_A$–$h_D$) corresponds to an output (kW) of the refrigeration cycle, and the compression work expressed by the above ($h_B$–$h_A$), for example, electric energy required to operate the compressor corresponds to consumed motive power (kW). Besides, Q means the capability of refrigerating the load fluid, and a higher Q means that the same heat cycle system can perform a larger amount of work. In other words, having a high Q indicates that a target performance can be obtained by a small amount of the working fluid for the heat cycle, thus enabling downsizing of the heat cycle system.

Note that when operating the heat cycle system, in order to prevent occurrence of failure due to mixture of moisture and mixture of noncondensing gas such as oxygen, it is preferable to provide a means for suppressing the mixture of them.

Moisture mixed into the heat cycle system may cause problems when the heat cycle system is used particularly at low temperature. For example, problems such as freezing in a capillary tube, hydrolysis of the working fluid for the heat cycle and the refrigerant oil, deterioration of material due to acid components generated in the cycle, and generation of contaminants occur. In particular, when the refrigerant oil is the polyglycol oil, the polyol ester oil, and the like, the refrigerant oil is extremely high in hygroscopicity, is likely to cause a hydrolysis reaction, and decreases in characteristics as the refrigerant oil, resulting in a major cause to lose long-term reliability of the compressor. Accordingly, to suppress the hydrolysis of the refrigerant oil, it is necessary to control the moisture concentration in the heat cycle system.

As a method of controlling the moisture concentration in the heat cycle system, there can be cited a method of using a moisture removing means such as a drying agent (silica gel, activated alumina, zeolite, or the like). Bringing the drying agent into contact with a liquid composition for a heat cycle system is preferred in terms of dehydration efficiency. For example, the drying agent is preferably placed at an outlet of the condenser 12 or an inlet of the evaporator 14 to bring the drying agent into contact with the composition for heat cycle system.

As the drying agent, a zeolite-based drying agent is preferable in terms of the chemical reactivity between the drying agent and the working fluid for the heat cycle and the hygroscopicity of the drying agent.

As the zeolite-based drying agent, a zeolite-based drying agent containing a compound expressed by the following expression (3) as a main component is preferable in terms of being excellent in hygroscopicity in the case of using a refrigerant oil higher in moisture absorption amount than the conventional mineral-based refrigerant oil.

$$M_{2/n}O \cdot Al_2O_3 \cdot xSiO_2 \cdot yH_2O \qquad \text{expression (3)}$$

M is an element of Group 1 such as Na, K or an element of Group 2 such as Ca, n is a valence of M, x and y are values decided by a crystal structure. By changing M, the pore diameter can be adjusted.

In selecting the drying agent, a pore diameter and a breaking strength are important. In the case of using a drying agent having a pore diameter larger than a molecular diameter of the working fluid for the heat cycle contained in the composition for the heat cycle system, the working fluid for the heat cycle is absorbed into the drying agent. As a result, a chemical reaction occurs between the working fluid for the heat cycle and the drying agent, thereby causing unfavorable phenomena such as generation of noncondensing gas, a decrease in strength of the drying agent, and a decrease in absorption capacity.

Accordingly, as the drying agent, it is preferred to use a zeolite-based drying agent having a small pore diameter. In particular, a sodium-potassium A type synthetic zeolite having a pore diameter of 3.5 angstrom or less is preferred. Applying the sodium-potassium A type synthetic zeolite having the pore diameter smaller than the molecular diameter of the working fluid for the heat cycle makes it possible to selectively absorb and remove only moisture in the heat cycle system without absorbing the working fluid for the heat cycle. In other words, since the absorption of the working fluid for the heat cycle to the drying agent is unlikely occur, thermal decomposition becomes less likely to occur, thereby making it possible to suppress deterioration of the material forming the heat cycle system and occurrence of contaminants.

The size of the zeolite-based drying agent is preferably about 0.5 mm or more and 5 mm or less because the zeolite-based drying agent having a too-small size causes clogging of a valve or a pipe small portion in the heat cycle system, whereas the zeolite-based drying agent having a too-large size decreases the drying ability. The shape of the zeolite-based drying agent is preferably granular or cylindrical.

The zeolite-based drying agent can be made into an arbitrary shape by solidifying powdery zeolite with a binder (bentonite or the like). As long as the zeolite-based drying agent is used as a main body, other drying agents (silica gel, activated alumina, or the like) may be used together. A use ratio of the zeolite-based drying agent to the composition for the heat cycle system is not particularly limited.

Further, the noncondensing gas, when entering the inside of the heat cycle system, has adverse effects such as failure of thermal transfer in the condenser and the evaporator and an increase in working pressure, and therefore the mixture of the noncondensing gas needs to be suppressed as much as possible. In particular, oxygen being one noncondensing gas reacts with the working fluid for the heat cycle and the refrigerant oil to promote decomposition.

A concentration of the noncondensing gas is preferably 1.5 volume % or less and particularly preferably 0.5 volume % or less by volume percent with respect to the working fluid for the heat cycle in a gas phase part of the working fluid for the heat cycle.

According to the above-described heat cycle system of this invention, use of the working fluid for the heat cycle of this invention makes it possible to obtain practically sufficient cycle performance excellent in durability while suppressing effect on global warming.

EXAMPLES

Hereinafter, the present invention will be described in detail using examples, but the present invention is not limited by the following examples. Note that as values of the global warming potential (GWP) in compounds used for the following examples, the values illustrated in the above-described Table 1 and the following Table 2 were used.

TABLE 2

| Compound | GWP |
|---|---|
| $CO_2$ | 1.0 |
| HFC-41 | 150.0 |
| $CF_3I$ | 1.0 |
| $C_3H_8$ | 3.0 |
| HFC-32 | 675.0 |
| HFO-1234yf | 4.0 |
| HFO-1234ze | 6.0 |

Example 1

In an example 1, working fluids for a heat cycle (hereinafter, referred to also as the "working fluids") each made by mixing HFO-1123 and carbon dioxide ($CO_2$), fluoromethane (HFC-41), trifluoroiodomethane ($CF_3I$) or propane ($C_3H_8$) being the first component at percentages listed in Table 3 were fabricated, and the global warming potential (GWP), the relative cycle performance (with respect to R410A), and the self-decomposition property were measured, calculated and determined by the above-described methods. Results are illustrated in Table 3 together with compositions of the working fluids. Note that in Table 3, No. 1, No. 9, No. 10, No. 15, No. 16, No. 21, No. 22, and No. 27 are comparative examples.

TABLE 3

| No. | HFO-1123 [mass %] | CO$_2$ [mass %] | HFC-41 [mass %] | CF$_3$I [mass %] | C$_3$H$_8$ [mass %] | Relative coefficient of performance (RCOP$_{R410A}$) | Relative refrigerating capacity (RQ$_{R410A}$) | GWP | Self-decomposition property |
|---|---|---|---|---|---|---|---|---|---|
| 1 | 100 | 0 | | | | 0.91 | 1.11 | 0.30 | Presence |
| 2 | 80 | 20 | | | | 0.86 | 1.61 | 0.44 | Absence |
| 3 | 75 | 25 | | | | 0.83 | 1.68 | 0.48 | Absence |
| 4 | 70 | 30 | | | | 0.80 | 1.74 | 0.51 | Absence |
| 5 | 65 | 35 | | | | 0.77 | 1.80 | 0.55 | Absence |
| 6 | 60 | 40 | | | | 0.74 | 1.84 | 0.58 | Absence |
| 7 | 40 | 60 | | | | — | — | 0.72 | Absence |
| 8 | 20 | 80 | | | | — | — | 0.86 | Absence |
| 9 | 0 | 100 | | | | — | — | 1.00 | Absence |
| 10 | 100 | | 0 | | | 0.91 | 1.11 | 0.30 | Presence |
| 11 | 80 | | 20 | | | 0.88 | 1.39 | 30.24 | Absence |
| 12 | 60 | | 40 | | | 0.86 | 1.57 | 60.18 | Absence |
| 13 | 40 | | 60 | | | 0.84 | 1.72 | 90.12 | Absence |
| 14 | 20 | | 80 | | | 0.83 | 1.84 | 120.06 | Absence |
| 15 | 0 | | 100 | | | 0.83 | 1.94 | 150.00 | Absence |
| 16 | 100 | | | 0 | | 0.91 | 1.11 | 0.30 | Presence |
| 17 | 80 | | | 20 | | 0.96 | 0.99 | 0.44 | Absence |
| 18 | 60 | | | 40 | | 1.02 | 0.88 | 0.58 | Absence |
| 19 | 40 | | | 60 | | 1.09 | 0.74 | 0.72 | Absence |
| 20 | 20 | | | 80 | | 1.13 | 0.56 | 0.86 | Absence |
| 21 | 0 | | | 100 | | 1.11 | 0.33 | 1.00 | Absence |
| 22 | 100 | | | | 0 | 0.91 | 1.11 | 0.30 | Presence |
| 23 | 80 | | | | 20 | 1.00 | 0.91 | 0.84 | Absence |
| 24 | 60 | | | | 40 | 1.04 | 0.78 | 1.38 | Absence |
| 25 | 40 | | | | 60 | 1.05 | 0.69 | 1.92 | Absence |
| 26 | 20 | | | | 80 | 1.05 | 0.63 | 2.46 | Absence |
| 27 | 0 | | | | 100 | 1.05 | 0.58 | 3.00 | Absence |

Example 2

In an example 2, the working fluids each made by mixing HFO-1123, carbon dioxide (CO$_2$) as the first component, and HFC-32, HFO-1234yf or HFO-1234xe as the second component at percentages listed in Tables 4 to 6 were fabricated, and the global warming potential (GWP), the relative cycle performance (with respect to R410A), and the self-decomposition property were measured, calculated and determined by the above-described methods. Results are illustrated in Tables 4 to 6 together with compositions of the working fluids.

TABLE 4

| No. | HFO-1123 [mass %] | First component CO$_2$ [mass %] | Second component HFC-32 [mass %] | Relative coefficient of performance (RCOP$_{R410A}$) | Relative refrigerating capacity (RQ$_{R410A}$) | GWP | Self-decomposition property |
|---|---|---|---|---|---|---|---|
| 28 | 90 | 5 | 5 | 0.93 | 1.29 | 34.1 | Absence |
| 29 | 85 | 5 | 10 | 0.93 | 1.30 | 67.8 | Absence |
| 30 | 80 | 5 | 15 | 0.94 | 1.30 | 101.5 | Absence |
| 31 | 75 | 5 | 20 | 0.94 | 1.31 | 135.3 | Absence |
| 32 | 70 | 5 | 25 | 0.95 | 1.31 | 169.0 | Absence |
| 33 | 85 | 10 | 5 | 0.92 | 1.42 | 34.1 | Absence |
| 34 | 80 | 10 | 10 | 0.93 | 1.43 | 67.8 | Absence |
| 35 | 75 | 10 | 15 | 0.93 | 1.43 | 101.6 | Absence |
| 36 | 70 | 10 | 20 | 0.94 | 1.43 | 135.3 | Absence |
| 37 | 65 | 10 | 25 | 0.95 | 1.43 | 169.0 | Absence |
| 38 | 60 | 10 | 30 | 0.96 | 1.42 | 202.8 | Absence |
| 39 | 40 | 10 | 50 | 0.99 | 1.40 | 337.7 | Absence |
| 40 | 20 | 10 | 70 | 1.01 | 1.36 | 472.7 | Absence |
| 41 | 80 | 15 | 5 | 0.90 | 1.53 | 34.1 | Absence |
| 42 | 75 | 15 | 10 | 0.91 | 1.53 | 67.9 | Absence |
| 43 | 70 | 15 | 15 | 0.92 | 1.53 | 101.6 | Absence |
| 44 | 65 | 15 | 20 | 0.93 | 1.53 | 135.3 | Absence |

TABLE 4-continued

| No. | Working medium composition | | | Relative cycle performance (with respect to R410A) | | GWP | Self-decomposition property |
| | HFO-1123 [mass %] | First component CO$_2$ [mass %] | Second component HFC-32 [mass %] | Relative coefficient of performance (RCOP$_{R410A}$) | Relative refrigerating capacity (RQ$_{R410A}$) | | |
|---|---|---|---|---|---|---|---|
| 45 | 60 | 15 | 25 | 0.94 | 1.53 | 169.1 | Absence |
| 46 | 75 | 20 | 5 | 0.87 | 1.62 | 34.2 | Absence |
| 47 | 70 | 20 | 10 | 0.89 | 1.62 | 67.9 | Absence |
| 48 | 68 | 20 | 15 | 0.90 | 1.62 | 101.6 | Absence |
| 49 | 60 | 20 | 20 | 0.91 | 1.62 | 135.4 | Absence |
| 50 | 55 | 20 | 25 | 0.93 | 1.62 | 169.1 | Absence |
| 51 | 50 | 20 | 30 | 0.94 | 1.62 | 202.9 | Absence |
| 52 | 30 | 20 | 50 | 0.98 | 1.59 | 337.8 | Absence |
| 53 | 10 | 20 | 70 | 1.01 | 1.54 | 472.7 | Absence |
| 54 | 60 | 30 | 10 | 0.84 | 1.77 | 68.0 | Absence |
| 55 | 40 | 30 | 30 | 0.91 | 1.78 | 202.9 | Absence |
| 56 | 20 | 30 | 50 | 0.96 | 1.74 | 337.9 | Absence |
| 57 | 50 | 40 | 10 | 0.80 | 1.90 | 68.1 | Absence |
| 58 | 30 | 40 | 30 | 0.88 | 1.92 | 203.0 | Absence |
| 59 | 10 | 40 | 50 | 0.94 | 1.88 | 337.9 | Absence |
| 60 | 40 | 50 | 10 | 0.76 | 2.01 | 68.1 | Absence |
| 61 | 20 | 50 | 30 | 0.85 | 2.05 | 203.1 | Absence |
| 62 | 30 | 60 | 10 | 0.73 | 2.11 | 68.2 | Absence |
| 63 | 10 | 60 | 30 | 0.83 | 2.17 | 203.1 | Absence |
| 64 | 20 | 70 | 10 | — | — | 68.3 | Absence |
| 65 | 10 | 80 | 10 | — | — | 68.3 | Absence |

TABLE 5

| No. | Working medium composition | | | Relative cycle performative (with respect to R410A) | | GWP | Self-decomposition property |
| | HFO-1123 [mass %] | First component CO$_2$ [mass %] | Second component HFO-1234yf [mass %] | Relative coefficient of performance (RCOP$_{R410A}$) | Relative refrigerating capacity (RQ$_{R410A}$) | | |
|---|---|---|---|---|---|---|---|
| 66 | 80 | 10 | 10 | 0.95 | 1.36 | 0.74 | Absence |
| 67 | 60 | 10 | 30 | 1.03 | 1.24 | 1.48 | Absence |
| 68 | 40 | 10 | 50 | 1.12 | 1.12 | 2.22 | Absence |
| 69 | 20 | 10 | 70 | 1.19 | 1.00 | 2.96 | Absence |
| 70 | 70 | 20 | 10 | 0.90 | 1.55 | 0.81 | Absence |
| 71 | 50 | 20 | 30 | 0.99 | 1.45 | 1.55 | Absence |
| 72 | 30 | 20 | 50 | 1.09 | 1.35 | 2.29 | Absence |
| 73 | 10 | 20 | 70 | 1.18 | 1.24 | 3.03 | Absence |
| 74 | 60 | 30 | 10 | 0.84 | 1.69 | 0.88 | Absence |
| 75 | 40 | 30 | 30 | 0.93 | 1.60 | 1.62 | Absence |
| 76 | 20 | 30 | 50 | 1.03 | 1.51 | 2.36 | Absence |
| 77 | 50 | 40 | 10 | 0.78 | 1.80 | 0.95 | Absence |
| 78 | 30 | 40 | 30 | 0.87 | 1.72 | 1.69 | Absence |
| 79 | 10 | 40 | 50 | 0.98 | 1.64 | 2.43 | Absence |
| 80 | 40 | 50 | 10 | 0.73 | 1.90 | 1.02 | Absence |
| 81 | 20 | 50 | 30 | 0.83 | 1.83 | 1.76 | Absence |
| 82 | 30 | 60 | 10 | 0.69 | 1.98 | 1.09 | Absence |
| 83 | 10 | 60 | 30 | 0.79 | 1.94 | 1.83 | Absence |
| 84 | 20 | 70 | 10 | — | — | 1.16 | Absence |
| 85 | 10 | 80 | 10 | — | — | 1.23 | Absence |

TABLE 6

| | Working medium composition | | | Evaluation | | | |
|---|---|---|---|---|---|---|---|
| | | | | Relative cycle performative (with respect to R410A) | | | |
| No. | First component HFO-1123 [mass %] | component $CO_2$ [mass %] | Second component HFO-1234zc [mass %] | Relative coefficient of performance ($RCOP_{R410A}$) | Relative refrigerating capacity ($RQ_{R410A}$) | GWP | Self-decomposition property |
| 86 | 80 | 10 | 10 | 0.87 | 1.23 | 0.94 | Absence |
| 87 | 60 | 10 | 30 | 0.92 | 1.05 | 2.08 | Absence |
| 88 | 40 | 10 | 50 | 0.98 | 0.89 | 3.22 | Absence |
| 89 | 20 | 10 | 70 | 1.02 | 0.73 | 4.36 | Absence |
| 90 | 70 | 20 | 10 | 0.82 | 1.39 | 1.01 | Absence |
| 91 | 50 | 20 | 30 | 0.89 | 1.23 | 2.15 | Absence |
| 92 | 30 | 20 | 50 | 0.97 | 1.07 | 3.29 | Absence |
| 93 | 10 | 20 | 70 | 1.04 | 0.92 | 4.43 | Absence |
| 94 | 60 | 30 | 10 | 0.79 | 1.56 | 1.08 | Absence |
| 95 | 40 | 30 | 30 | 0.87 | 1.39 | 2.22 | Absence |
| 96 | 20 | 30 | 50 | 0.95 | 1.24 | 3.36 | Absence |
| 97 | 50 | 40 | 10 | 0.75 | 1.69 | 1.15 | Absence |
| 98 | 30 | 40 | 30 | 0.84 | 1.53 | 2.29 | Absence |
| 99 | 10 | 40 | 50 | 0.93 | 1.38 | 3.43 | Absence |
| 100 | 40 | 50 | 10 | 0.72 | 1.80 | 1.22 | Absence |
| 101 | 20 | 50 | 30 | 0.82 | 1.66 | 2.36 | Absence |
| 102 | 30 | 60 | 10 | 0.69 | 1.91 | 1.29 | Absence |
| 103 | 10 | 60 | 30 | 0.79 | 1.78 | 2.43 | Absence |
| 104 | 20 | 70 | 10 | 0.67 | 2.01 | 1.36 | Absence |
| 105 | 10 | 80 | 10 | — | — | 1.43 | Absence |

Example 3

In an example 3, the working fluids each made by mixing HFO-1123 and propane ($C_3H_8$) as the first component, and HFC-32, HFO-1234yf or HFO-1234ze as the second component at percentages listed in Tables 7 to 9 were fabricated, and the global warming potential (GWP), the relative cycle performance (with respect to R410A), and the self-decomposition property were measured, calculated and determined by the above-described methods. Results are illustrated in Tables 7 to 9 together with compositions of the working fluids.

TABLE 7

| | Working medium composition | | | Evaluation | | | |
|---|---|---|---|---|---|---|---|
| | | | | Relative cycle performance (with respect to R410A) | | | |
| No. | First component HFO-1123 [mass %] | component $C_3H_8$ [mass %] | Second component HFC-32 [mass %] | Relative coefficient of performance ($RCOP_{R410A}$) | Relative refrigerating capacity ($RQ_{R410A}$) | GWP | Self-decomposition property |
| 106 | 90 | 5 | 5 | 0.94 | 1.07 | 34.2 | Absence |
| 107 | 85 | 5 | 10 | 0.94 | 1.09 | 67.9 | Absence |
| 108 | 80 | 5 | 15 | 0.94 | 1.11 | 101.6 | Absence |
| 109 | 75 | 5 | 20 | 0.94 | 1.12 | 135.4 | Absence |
| 110 | 70 | 5 | 25 | 0.95 | 1.13 | 169.1 | Absence |
| 111 | 85 | 10 | 5 | 0.96 | 1.03 | 34.3 | Absence |
| 112 | 80 | 10 | 10 | 0.96 | 1.05 | 68.0 | Absence |
| 113 | 75 | 10 | 15 | 0.96 | 1.05 | 101.8 | Absence |
| 114 | 70 | 10 | 20 | 0.95 | 1.08 | 135.5 | Absence |
| 115 | 65 | 10 | 25 | 0.95 | 1.10 | 169.2 | Absence |
| 116 | 60 | 10 | 30 | 0.95 | 1.12 | 203.0 | Absence |
| 117 | 40 | 10 | 50 | 0.96 | 1.15 | 337.9 | Absence |
| 118 | 20 | 10 | 70 | 0.98 | 1.17 | 472.9 | Absence |
| 119 | 80 | 15 | 5 | 0.98 | 0.98 | 34.4 | Absence |
| 120 | 75 | 15 | 10 | 0.97 | 1.01 | 68.2 | Absence |
| 121 | 70 | 15 | 15 | 0.97 | 1.03 | 101.9 | Absence |
| 122 | 65 | 15 | 20 | 0.96 | 1.05 | 135.6 | Absence |
| 123 | 60 | 15 | 25 | 0.96 | 1.07 | 169.4 | Absence |
| 124 | 75 | 20 | 5 | 1.00 | 0.95 | 34.6 | Absence |
| 125 | 70 | 20 | 10 | 0.99 | 0.98 | 68.3 | Absence |
| 126 | 65 | 20 | 15 | 0.98 | 1.00 | 102.0 | Absence |
| 127 | 60 | 20 | 20 | 0.97 | 1.02 | 135.8 | Absence |
| 128 | 55 | 20 | 25 | 0.97 | 1.04 | 169.5 | Absence |
| 129 | 50 | 20 | 30 | 0.96 | 1.06 | 203.3 | Absence |
| 130 | 30 | 20 | 50 | 0.96 | 1.13 | 338.2 | Absence |
| 131 | 10 | 20 | 70 | 0.96 | 1.17 | 473.1 | Absence |

TABLE 7-continued

| No. | Working medium composition | | | Relative cycle performance (with respect to R410A) | | GWP | Self-decomposition property |
|---|---|---|---|---|---|---|---|
| | First component HFO-1123 [mass %] | Second component $C_3H_8$ [mass %] | HFC-32 [mass %] | Relative coefficient of performance ($RCOP_{R410A}$) | Relative refrigerating capacity ($RQ_{R410A}$) | | |
| 132 | 60 | 30 | 10 | 1.02 | 0.93 | 68.6 | Absence |
| 133 | 40 | 30 | 30 | 0.98 | 1.02 | 203.5 | Absence |
| 134 | 20 | 30 | 50 | 0.96 | 1.10 | 338.5 | Absence |
| 135 | 50 | 40 | 10 | 1.04 | 0.89 | 68.9 | Absence |
| 136 | 30 | 40 | 30 | 0.99 | 0.99 | 203.8 | Absence |
| 137 | 10 | 40 | 50 | 0.95 | 1.07 | 338.7 | Absence |
| 138 | 40 | 50 | 10 | 1.07 | 0.86 | 69.1 | Absence |
| 139 | 20 | 50 | 30 | 1.02 | 0.97 | 204.1 | Absence |
| 140 | 30 | 60 | 10 | 1.09 | 0.83 | 69.4 | Absence |
| 141 | 20 | 70 | 10 | 1.11 | 0.81 | 69.7 | Absence |
| 142 | 10 | 80 | 10 | 1.13 | 0.80 | 69.9 | Absence |

TABLE 8

| No. | Working medium composition | | | Relative cycle performance (with respect to R410A) | | GWP | Self-decomposition property |
|---|---|---|---|---|---|---|---|
| | First component HFO-1123 [mass %] | Second component $C_3H_8$ [mass %] | HFO-1234yf [mass %] | Relative coefficient of performance ($RCOP_{R410A}$) | Relative refrigerating capacity ($RQ_{R410A}$) | | |
| 143 | 80 | 10 | 10 | 0.98 | 0.94 | 0.9 | Absence |
| 144 | 60 | 10 | 30 | 1.01 | 0.83 | 1.7 | Absence |
| 145 | 40 | 10 | 50 | 1.03 | 0.71 | 2.4 | Absence |
| 146 | 20 | 10 | 70 | 1.04 | 0.60 | 3.2 | Absence |
| 147 | 70 | 20 | 10 | 1.01 | 0.86 | 1.2 | Absence |
| 148 | 50 | 20 | 30 | 1.03 | 0.76 | 2.0 | Absence |
| 149 | 30 | 20 | 50 | 1.03 | 0.66 | 2.7 | Absence |
| 150 | 10 | 20 | 70 | 1.03 | 0.57 | 3.4 | Absence |
| 151 | 60 | 30 | 10 | 1.03 | 0.80 | 1.5 | Absence |
| 152 | 40 | 30 | 30 | 1.03 | 0.71 | 2.2 | Absence |
| 153 | 20 | 30 | 50 | 1.03 | 0.63 | 3.0 | Absence |
| 154 | 50 | 40 | 10 | 1.04 | 0.74 | 1.8 | Absence |
| 155 | 30 | 40 | 30 | 1.04 | 0.67 | 2.5 | Absence |
| 156 | 10 | 40 | 50 | 1.03 | 0.60 | 3.2 | Absence |
| 157 | 40 | 50 | 10 | 1.04 | 0.70 | 2.0 | Absence |
| 158 | 20 | 50 | 30 | 1.04 | 0.63 | 2.8 | Absence |
| 159 | 30 | 60 | 10 | 1.05 | 0.66 | 2.3 | Absence |
| 160 | 10 | 60 | 30 | 1.04 | 0.61 | 3.0 | Absence |
| 161 | 20 | 70 | 10 | 1.05 | 0.63 | 2.6 | Absence |
| 162 | 10 | 80 | 10 | 1.05 | 0.61 | 2.8 | Absence |

TABLE 9

| No. | Working medium composition | | | Relative cycle performance (with respect to R410A) | | GWP | Self-decomposition property |
|---|---|---|---|---|---|---|---|
| | First component HFO-1123 [mass %] | Second component $C_3H_8$ [mass %] | HFO-1234zc [mass %] | Relative coefficient of performance ($RCOP_{R410A}$) | Relative refrigerating capacity ($RQ_{R410A}$) | | |
| 163 | 80 | 10 | 10 | 0.99 | 0.94 | 1.1 | Absence |
| 164 | 60 | 10 | 30 | 1.02 | 0.81 | 2.3 | Absence |
| 165 | 40 | 10 | 50 | 1.05 | 0.68 | 3.4 | Absence |
| 166 | 20 | 10 | 70 | 1.08 | 0.56 | 4.6 | Absence |

TABLE 9-continued

| | Working medium composition | | | Evaluation | | | |
|---|---|---|---|---|---|---|---|
| | | | | Relative cycle performance (with respect to R410A) | | | |
| No. | First component HFO-1123 [mass %] | Second component C$_3$H$_8$ [mass %] | HFO-1234zc [mass %] | Relative coefficient of performance (RCOP$_{R410A}$) | Relative refrigerating capacity (RQ$_{R410A}$) | GWP | Self-decomposition property |
| 167 | 70 | 20 | 10 | 1.01 | 0.86 | 1.4 | Absence |
| 168 | 50 | 20 | 30 | 1.03 | 0.75 | 2.6 | Absence |
| 169 | 30 | 20 | 50 | 1.04 | 0.64 | 3.7 | Absence |
| 170 | 10 | 20 | 70 | 1.05 | 0.54 | 4.8 | Absence |
| 171 | 60 | 30 | 10 | 1.03 | 0.79 | 1.7 | Absence |
| 172 | 40 | 30 | 30 | 1.04 | 0.70 | 2.8 | Absence |
| 173 | 20 | 30 | 50 | 1.04 | 0.61 | 4.0 | Absence |
| 174 | 50 | 40 | 10 | 1.04 | 0.74 | 2.0 | Absence |
| 175 | 30 | 40 | 30 | 1.04 | 0.66 | 3.1 | Absence |
| 176 | 10 | 40 | 50 | 1.04 | 0.58 | 4.2 | Absence |
| 177 | 40 | 50 | 10 | 1.04 | 0.70 | 2.2 | Absence |
| 178 | 20 | 50 | 30 | 1.04 | 0.63 | 3.4 | Absence |
| 179 | 30 | 60 | 10 | 1.05 | 0.66 | 2.5 | Absence |
| 180 | 10 | 60 | 30 | 1.04 | 0.60 | 3.6 | Absence |
| 181 | 20 | 70 | 10 | 1.05 | 0.63 | 2.8 | Absence |
| 182 | 10 | 80 | 10 | 1.05 | 0.61 | 3.0 | Absence |

It is clear that the working fluids for the heat cycle each containing HFO-1123 and the first component illustrated in Table 3 do not have the self-decomposition property, have the small global warming potential, and the sufficiently excellent cycle performance on practical use. Besides, it is also clear that the working fluids for the heat cycle each containing HFO-1123, the first component, and further the second component illustrated in Tables 4 to 9 do not have the self-decomposition property, have the small global worming potential, and the sufficiently excellent cycle performance on practical use.

INDUSTRIAL APPLICABILITY

The composition for the heat cycle system of this invention and the heat cycle system using the composition can be utilized for refrigerating apparatuses (such as a built-in showcase, a separate showcase, an industrial fridge-freezer, a vending machine, and an ice making machine), air-conditioning apparatuses (such as a room air-conditioner, a store packaged air-conditioner, a building packaged air-conditioner, a plant packaged air-conditioner, a gas engine heat pump, a train air-conditioning system, and an automobile air-conditioning system), a power generation system (such as exhaust heat recovery power generation), a heat transport apparatus (such as a heat pipe), and a secondary cooling machine.

What is claimed is:

1. A working fluid for a heat cycle, comprising:
trifluoroethylene;
a first component comprising propane; and
a second component selected from the group consisting of hydrofluoroolefins where trifluoroethylene is excluded,
wherein
the hydrofluoroolefins have a global warming potential in the Intergovernmental Panel on Climate Change Fourth Assessment Report of 2000 or less,
a ratio of a total amount of the trifluoroethylene, the first component and the second component with respect to an entire amount of the working fluid for the heat cycle is in a range of over 90 mass % to 100 mass %,
a ratio of an amount of the trifluoroethylene with respect to the total amount of the trifluoroethylene, the first component and the second component is in a range of 10 mass % to 90 mass %,
a ratio of an amount of the propane with respect to the total amount of the trifluoroethylene, the first component and the second component is in a range of 10 mass % to 50 mass %, and
a ratio of an amount of the second component with respect to the total amount of the trifluoroethylene, the first component and the second component is in a range of 1 mass % to 70 mass %.

2. The working fluid for the heat cycle according to claim 1, wherein a ratio of a total amount of the trifluoroethylene and the first component with respect to an entire amount of the working fluid for the heat cycle is in a range of over 90 mass % to 100 mass %, and a ratio of an amount of the trifluoroethylene with respect to the total amount of the trifluoroethylene and the first component is in a range of 20 mass % to 95 mass %.

3. The working fluid for the heat cycle according to claim 2, wherein 2,3,3,3-tetrafluoropropene is the second component.

4. The working fluid for the heat cycle according to claim 2, wherein 1,3,3,3-tetrafluoropropene is the second component.

5. The working fluid for the heat cycle according to claim 1, wherein a ratio of a total amount of the trifluoroethylene and the propane with respect to an entire amount of the working fluid for the heat cycle is in a range of 90 mass % to 100 mass %, and a ratio of an amount of the trifluoroethylene with respect to the total amount of the trifluoroethylene and the propane is in a range of 20 mass % to 95 mass %.

6. The working fluid for the heat cycle according to claim 3, wherein the second component is at least one of 2,3,3,3-tetrafluoropropene, or 1,3,3,3-tetrafluoropropene.

7. The working fluid for the heat cycle according to claim 1, wherein the second component is at least one of 2,3,3,3-tetrafluoropropene, or 1,3,3,3-tetrafluoropropene.

8. The working fluid for the heat cycle according to claim 1, wherein 2,3,3,3-tetrafluoropropene is the second component.

9. The working fluid for the heat cycle according to claim 8, wherein a ratio of a total amount of the trifluoroethylene, the propane and the 2,3,3,3-tetrafluoropropene with respect to an entire amount of the working fluid for the heat cycle is in a range of over 90 mass % to 100 mass %, a ratio of an amount of the trifluoroethylene with respect to the total amount of the trifluoroethylene, the propane and the 2,3,3,3-tetrafluoropropene is in a range of 20 mass % to 95 mass %, a ratio of an amount of the propane with respect to the total amount of the trifluoroethylene, the propane and the 2,3,3,3-tetrafluoropropene is in a range of 1 mass % to 75 mass %, and a ratio of an amount of the 2,3,3,3-tetrafluoropropene with respect to the total amount of the trifluoroethylene, the propane and the 2,3,3,3-tetrafluoropropene is in a range of 1 mass % to 75 mass %.

10. The working fluid for the heat cycle according to claim 1, wherein 1,3,3,3-tetrafluoropropene is the second component.

11. The working fluid for the heat cycle according to claim 10, wherein a ratio of a total amount of the trifluoroethylene, the propane and the 1,3,3,3-tetrafluoropropene with respect to an entire amount of the working fluid for the heat cycle is in a range of over 90 mass % to 100 mass %, a ratio of an amount of the trifluoroethylene with respect to the total amount of the trifluoroethylene, the propane and the 1,3,3,3-tetrafluoropropene is in a range of 20 mass % to 95 mass %, a ratio of an amount of the propane with respect to the total amount of the trifluoroethylene, the propane and the 1,3,3,3-tetrafluoropropene is in a range of 1 mass % to 75 mass %, and a ratio of an amount of the 1,3,3,3-tetrafluoropropene with respect to the total amount of the trifluoroethylene, the propane and the 1,3,3,3-tetrafluoropropene is in a range of 1 mass % to 75 mass %.

12. The working fluid for the heat cycle according to claim 1, wherein a ratio of a total amount of the trifluoroethylene, the propane and the second component with respect to an entire amount of the working fluid for the heat cycle is in a range of over 90 mass % to 100 mass %, a ratio of an amount of the trifluoroethylene with respect to the total amount of the trifluoroethylene, the propane and the second component is in a range of 20 mass % to 95 mass %, a ratio of an amount of the propane with respect to the total amount of the trifluoroethylene, the propane and the second component is in a range of 1 mass % to 75 mass %, and a ratio of an amount of the second component with respect to the total amount of the trifluoroethylene, the propane and the second component is in a range of 1 mass % to 75 mass %.

13. The working fluid for the heat cycle according to claim 1, wherein a ratio of the amount of the propane with respect to a total amount of the working fluid for the heat cycle is at least 10 mass %.

14. The working fluid for the heat cycle according to claim 1, wherein a ratio of the amount of the propane with respect to a total amount of the working fluid for the heat cycle is at least 20 mass %.

15. The working fluid for the heat cycle according to claim 2, wherein the second component is at least one of 2,3,3,3-tetrafluoropropene, or 1,3,3,3-tetrafluoropropene.

16. A heat cycle system comprising the working fluid according to claim 1.

17. The heat cycle system according to claim 16, wherein the heat cycle system is a refrigerating apparatus, an air-conditioning apparatus, a power generation system, a heat transport apparatus or a secondary cooling machine.

\* \* \* \* \*